United States Patent

Kozaki et al.

[11] Patent Number: 6,058,409
[45] Date of Patent: May 2, 2000

[54] COMPUTATION APPARATUS AND METHOD

[75] Inventors: Yasunari Kozaki; Osamu Ito, both of Tokyo; Yasunari Ikeda, Kanagawa, all of Japan

[73] Assignee: Sony Corporation, Japan

[21] Appl. No.: 08/905,923

[22] Filed: Aug. 5, 1997

[30] Foreign Application Priority Data

Aug. 6, 1996 [JP] Japan .............................. P08-206966

[51] Int. Cl.[7] .................................................. G06F 17/14
[52] U.S. Cl. ............................................ 708/409; 708/404
[58] Field of Search ....................... 364/725.01–725.03, 364/726.01–726.04, 726.07

[56] References Cited

U.S. PATENT DOCUMENTS

| | | | |
|---|---|---|---|
| 3,617,720 | 11/1971 | Gentleman | 364/726.02 |
| 4,138,730 | 2/1979 | Ali | 364/726.02 |
| 4,298,950 | 11/1981 | Smith, Jr. | 364/726.03 |
| 4,839,844 | 6/1989 | Watari | 364/727.01 |
| 5,093,801 | 3/1992 | White et al. | 364/726.02 |
| 5,293,330 | 3/1994 | Sayegh | 364/726.04 |
| 5,473,556 | 12/1995 | Aguilar et al. | 364/726.02 |
| 5,694,347 | 12/1997 | Ireland | 364/726.02 |

*Primary Examiner*—Hassan Kizou
*Assistant Examiner*—Douglas S. Lee
*Attorney, Agent, or Firm*—Lerner, David, Littenberg Krumholz & Mentlik, LLP

[57] ABSTRACT

A computation apparatus such as a Fast Fourier Transform (FFT) apparatus which processes ordered sets of data in a computation unit (4, 24) operating according to a high-speed clock includes an input buffer (1, 21) arranged to accept data in synchronism with a relatively low-speed clock, and an output buffer (6, 26) arranged to discharge the data in synchronism with the low-speed clock. The apparatus includes an internal memory (3, 23) as well as means such as selectors (2, 22) and (5, 25) for transferring data in synchronism with the high-speed clock from the input buffer to the computation unit or the memory; between the computation unit and the memory; and from the computation unit or the memory to the output buffer. The transferring means is arranged to reorder the data, preferably in reverse-digit sequence, during transfer from the input buffer or during transfer to the output buffer. This avoids the need for a separate reordering memory at the input end or output end of the device.

26 Claims, 20 Drawing Sheets

COMPUTATION APPARATUS AND METHOD

FIELD OF THE INVENTION

The present invention relates to a computation apparatus and method. More particularly, the present invention relates to a computation apparatus and method in which data input in a predetermined sequence is rearranged or in which data constituting the results of computation are rearranged.

BACKGROUND OF THE INVENTION

Digital signals are used in broadcast technology and in other signal processing applications such as audio and video recording and storage.

FIG. 18 shows an example of the construction of a receiver for digitally-transmitted audio signals according a format known as DAB (Digital Audio Broadcasting). A tuner 92 selects signals of a predetermined broadcasting station from signals received via an antenna 91 and outputs the signals to an A/D converter 93. The A/D converter 93 converts supplied signals from analog to digital form. The data recovered by A/D converter 93 includes both guard interval components and symbol components representing the transmitted data. The guard interval components are separated in the conventional manner, by conventional apparatus (not shown). The symbol components are supplied to a memory 100. The data is supplied to memory 100 in ordered sets. Each ordered set may include a series of digital values representing successive values of the signal provided by A/D converter during successive sampling intervals within a block of time used to transmit one or more symbol components.

A Fast Fourier Transform or "FFT" circuit 94 demodulates data which is transmitted in, for example, OFDM (Orthogonal Frequency Division Multiplexing) by performing an FFT computation in order to convert supplied data on a time axis into data on a frequency axis, and thereby separates a plurality of subcarrier waves.

A deinterleave circuit and error correction circuit 95 performs a deinterleave process on data supplied from the FFT circuit 94 and an error correction process thereon. A part of the signals processed by the deinterleave circuit and error correction circuit 95 are supplied to a decoding circuit 96. The decoding circuit 96 demodulates the supplied signals by DQPSK (Differential Quadrature Phase Shift Keying) and converts the demodulated data into analog audio signals, after which it outputs audio signals of the left and right channels to speakers 97 and 98 respectively, causing them to output sounds corresponding to those signals.

Further, an additional data output circuit 99 separates additional data, such as program contents or traffic information, from the signals supplied from the deinterleave circuit and error correction circuit 95 and outputs the signals. The digital data handling components of the receiver other than FFT circuit 94 operate in synchronism with a relatively low-speed system clock 111, whereas FFT circuit 94 operates in synchronism with a relatively high-speed internal clock 113 (FIG. 19) to perform the computations required for FFT transformation. This arrangement in which an FFT circuit operates in synchronism with a high-speed clock, but the other digital components of the apparatus operate in synchronism with a low-speed clock, is found in other digital signal processing devices as well.

A conventional interface between the FFT circuit and the remainder of the apparatus is depicted in FIG. 19. FFT transformation normally requires reordering of the incoming data or reordering of the final computation results provided as output data. The system of FIG. 19 uses input data reordering. Memory 100, operating in synchronism with the low-speed clock 111, accepts incoming sets of data, rearranges the data in a so-called "reverse-digit" sequence, and then outputs it to FFT circuit 94. A reverse-digit sequence is a particular reordering of the data of an ordered set. Where the order of each item of data in the original ordered set is a number M, the order of that item in the rearranged set is a number M', where M' is obtained by expressing M as a numeral in a base r, and reversing the digits of such numeral.

For example, in a case where a set including eight units of data is processed. (i.e., in a case where an FFT computation starting with 8 points is performed), the sequence position or order (0 to 7) of each of the eight units of data can be expressed in a three-bit binary (r=2). The 3rd (011B) unit of data becomes the 6-th (110B) unit of data in a reverse-digit sequence. In a similar manner, the eight units of data f(0) to f(7) are rearranged in a sequence (reverse-digit sequence) of f(0), f(4), f(2), f(6), f(1), f(5), f(3), and f(7).

FIG. 19 shows an example of the construction of the FFT circuit 94. An input buffer 102, as shown in FIG. 20, stores data f(0), f(4), f(2), f(6), f(1), f(5), f(3), and f(7), as previously rearranged in reverse-digit sequence by memory 100. Then, the input buffer 102 outputs the supplied data in an as-is sequence to a selector 103 in synchronization with high-speed internal clock 113 of the FFT circuit 94. That is, the input buffer 102 makes speed adjustments between the low-speed system clock of the receiving apparatus and the high-speed internal clock of the FFT circuit 94.

Then, the selector 103 stores data from the input buffer 102 in a set of locations in an internal memory 104 of the FFT circuit, depicted as the leftmost part of memory 104 in FIG. 20.

Next, a selector 105 initially outputs the 0-th input data f(0) and the 1st input data f(4) from memory 104 to a butterfly computation unit 106. The butterfly computation unit 106 performs a first-stage butterfly computation on these data and stores the computational results in a memory 104 via the selector 103 as the 0-th first-stage computation result data R1(0) and the 1st first-stage computation result data R1(1). A "butterfly computation" is a well-known procedure utilized in FFT and related algorithms. Each butterfly computation uses first and second digital values as inputs and produces two digital values as outputs. The first input is multiplied by a constant. The product is added to the second input to get one output, and the product is subtracted from the second input to get the other output.

In a similar manner, three additional first-stage butterfly computations are performed (i) on the 2nd input data f(2) and the 3rd input data f(6); (ii) on the 4-th input data f(1) and the input 5-th data f(5), and (iii) on the 6-th input data f(3) and the 7-th input data f(7) to provide 2nd through 7-th first-stage computational results R1(2) through R1(7). These further first-stage computational results are stored at respective locations in memory 104, so that that all of the first stage computational results form an ordered set in the memory.

Next, the selector 105 reads out the 0-th data R1(0) and the 2nd data R1(2) of the memory 104, and outputs them to the butterfly computation unit 106. The butterfly computation unit 106 performs a second-stage butterfly computation using these first stage computational results as inputs, to obtain second-stage computational results the R2(0) and R2(2). These second-stage computational results are stored by selector 103 in memory 104 as the 0-th and 2-nd elements of a new ordered set.

Furthermore, the selector 105 reads out the 1st data R1(1) and 3rd data R1(3) and outputs them to the butterfly computation unit 106. The butterfly computation unit 106 performs a second-stage butterfly computation on each of these data and stores the computational results in the memory 104 via the selector 103 as the 1st data R2(1) and the 3rd data R2(3).

In a similar manner, a butterfly computation is performed on the 4-th data R1(4) and the 6-th data R1(6) in the memory 104, and the computational results are stored as the 4-th data R2(4) and the 6-th data R2(6) in the memory 104. A butterfly computation is performed on each of the 5-th data R1(5) and the 7-th data R1(7) of the memory 104, and the computational results are stored as the 5-th data R2(5) and the 7-th data R2(7) in the memory 104. Thus, all of the second-stage computational results are stored in memory 104 as a new ordered set.

Next, the selector 105 reads out the 0-th second stage computational result data R2(0) and the 4-th second stage computational result data R2(4) from the memory 104, and outputs them to the butterfly computation unit 106. The butterfly computation unit 106 performs a third-stage butterfly computation on these data, and stores these final computational results in the memory 104 via the selector 103 as the 0-th final data F(0) and the 4-th final data F(4).

In a similar manner, a third-stage butterfly computation is performed on the 1st and 5-th second stage computational result data R2(1) and R2(5). The computational results are stored as the 1st and 5-th final computational result data F(1) and F(5) in memory 104. Further, a butterfly computation is performed on the 2nd and 6-th second stage computational results R2(2) and R2(6), and the results are stored as the 2nd and 6-th final computational results F(2) and F(6) in memory 104. A butterfly computation is performed on the 3rd and 7-th second stage computational results R2(3) and R2(7) from memory 104, and the computational results are stored as the 3rd and 7-th final computational results F(3) and F(7) in the memory 104. Thus, the internal memory 104, butterfly computation unit 106 and selector 103 of the FFT circuit cooperate to continually transfer data between the memory and the butterfly computation unit, so as to perform the multiple stages of butterfly computations needed in the FFT algorithm. This process yields an ordered set of final data F(0) to F(7), representing the results of the FFT computations.

Next, the selector 105 outputs the final data F(0) to F(7) stored in the memory 104 to an output buffer 107 in synchronization with high-speed internal clock 113.

Then, the output buffer 107 outputs the FFT-computed data F(0) to F(7) to deinterleave circuit and error correction circuit 95 in synchronization with low-speed system clock 111. That is, the output buffer 107 makes speed adjustments between the high-speed internal clock of the FFT circuit 94 and the low-speed system clock of the receiving apparatus.

The conventional apparatus and methods described above require a separate memory 100 for reordering the incoming data. This adds cost and complexity to the apparatus. Moreover, the reordering memory may limit the speed of operation of the apparatus. In other FFT systems, the input data is not reordered but the output data is reordered. In these systems, the data is transferred from the output buffer to a reordering memory similar to memory 100. These systems suffer from the similar problems.

SUMMARY OF THE INVENTION

The present invention provides apparatus and methods which overcome the problems described above. Computation apparatus according to one aspect of the invention includes an input buffer, a memory and an output buffer, each capable of storing data in an ordered set. The apparatus also includes a computation device for accepting selected elements of data and performing butterfly computations on these data in synchronism with a high-speed clock.

The input buffer is arranged to receive data in synchronism with a low-speed clock, and the output buffer is arranged to read out data in synchronism with a low-speed clock.

The apparatus according to this aspect of the invention further includes means for transferring data means for transferring data in synchronism with said high-speed clock:

(i) from said input buffer to said memory or to said computation unit; and (ii) between said memory and said computation unit; and (iii) from said memory or from said computation unit to said output buffer.

The transferring means is operative to reorder the data during transfer from said input buffer or during transfer to the output buffer. In apparatus according to this aspect of the invention the memory holds results of early-stage butterfly computations so that these can be retrieved and used as input data for further butterfly computations. The reordering process may occur at the input end of the device, when the data is transferred from the input buffer to the memory or to the computation unit. Alternatively, the reordering process may occur when the data, in final processed form after the butterfly computations, is transferred to the output buffer. In either case, because the reordering process is performed by the transferring means, there is no need for a separate reordering memory as used heretofore. Preferably, the reordering process at the input or output end reorders the data in reverse-digit sequence.

The transferring means desirably includes means for reading N data on which computations are to be performed from selected addresses of the memory, supplying said N data to said computation unit, and storing N results from said computation unit at said selected addresses. Thus, the transferring means is arranged to reuse the same addresses in the second memory. The addresses used to hold the data used as inputs to a particular butterfly computation are filled with the results of that computation. Thus, the memory need only be large enough to hold a single set of ordered data.

Where the transferring means is operative to transfer data from the input buffer to the memory, and to reorder the data during this transfer, the transferring means desirably includes a first selector for transferring data constituting the results of butterfly computations from the computation unit to the memory. The transferring means also includes a second selector for transferring data to be used in butterfly computations from the memory to the computation unit. The first selector is also operative to transfer data from the input buffer to the memory. Thus, the only components needed in the transferring means are those required for interchange of data between the computation unit and the memory. No additional components are required to perform the reordering operation.

In the alternative case where the transferring means is operative to transfer data from the input buffer to the computation unit, the data for the first stage butterfly calculations is taken directly from the input buffer. The transferring means desirably includes a first selector for transferring data from the memory to the computation unit and a second selector for transferring data from the computation unit to the memory. The first selector is also operative to transfer data from the input buffer to the computation unit, and to reorder the data in this transfer. Here again, no additional components need be provided to perform the reordering operation.

Preferably, the input buffer is operative to accept the in predetermined time sequence so that preselected elements of the data are written into the input buffer first, and the transferring means is operative to begin transferring said data from the input buffer by transferring the preselected elements of the data before all of the data has been written into said input buffer.

In the case where the transferring means is operative to transfer data from the memory to the output buffer, and to reorder the data during this transfer, the computation apparatus includes a first selector for transferring data from the computation unit to the memory and a second selector for transferring data from said memory to said computation unit. The second selector is also operative to transfer data from said memory to said output buffer.

In a further alternative arrangement the transferring means is operative to transfer data from the computation unit to the output buffer, and to reorder the data during this transfer. The transferring means includes a first selector for transferring data from the memory to the computation unit and a second selector for transferring data from the computation unit to the memory. The second selector is also operative to transfer data from the computation unit to the output buffer.

Preferably, the transferring means is operative to write the data into the output buffer in predetermined time sequence so that preselected elements of said data are written first and the output buffer may be arranged so that these preselected elements of said data can be read out of the output buffer before all of the data has been written into said output buffer.

In apparatus according to the above-described aspects of the invention, the computation unit and transferring means may be arranged to perform the butterfly computations in accordance with a time-thinning-type algorithm, also referred to as a "decimation in time" algorithm. Alternatively, these components can be arranged to perform these computations in accordance with a frequency-thinning algorithm, also referred to as a "decimation in frequency" algorithm.

A further aspect of the present invention provides methods of computation in data processing apparatus. A method according to this aspect of the invention includes the steps of writing an ordered set of data into an input buffer in synchronism with a low-speed clock, and performing butterfly computations in a computation unit in synchronism with a high-speed clock. The method further includes the step of transferring data in synchronism with said high-speed clock. Data is transferred (i) from said input buffer to a memory or to said computation unit; and (ii) between said memory and said computation unit; and (iii) from said memory or from said computation unit to an output buffer.

The transferring step includes the step of reordering the data either during transfer from the input buffer or during transfer to the output buffer. The data is read out from the output buffer in synchronism with a low-speed clock. Methods according to this aspect of the invention provide advantages similar to those discussed above in connection with the apparatus.

The foregoing objects, features and advantages of the present invention will be more readily apparent from the detailed description of the preferred embodiments set forth below, taken in conjunction with the accompanying drawings.

DETAILED DESCRIPTION OF THE PREFERRED EMBODIMENTS

Figure 1:
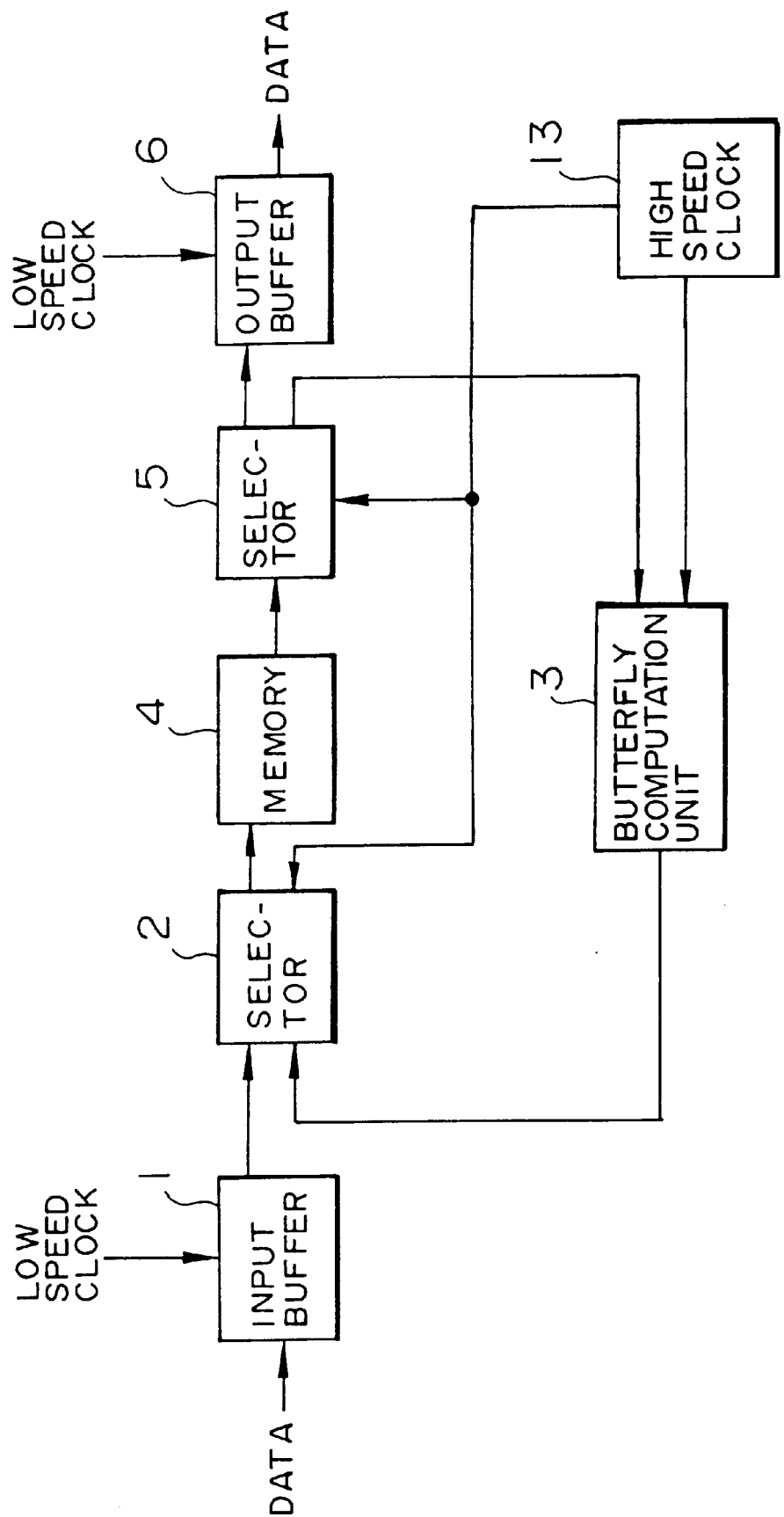
FIG. 1 is a block diagram illustrating the construction of a first embodiment of a computation apparatus of the present invention.

FIG. 1 shows the construction of a first embodiment of a computation apparatus of the present invention. This embodiment is, for example, an FFT computation apparatus used in place of the memory 100 and the FFT circuit 94 in the receiving apparatus in FIG. 18.

Figure 18:
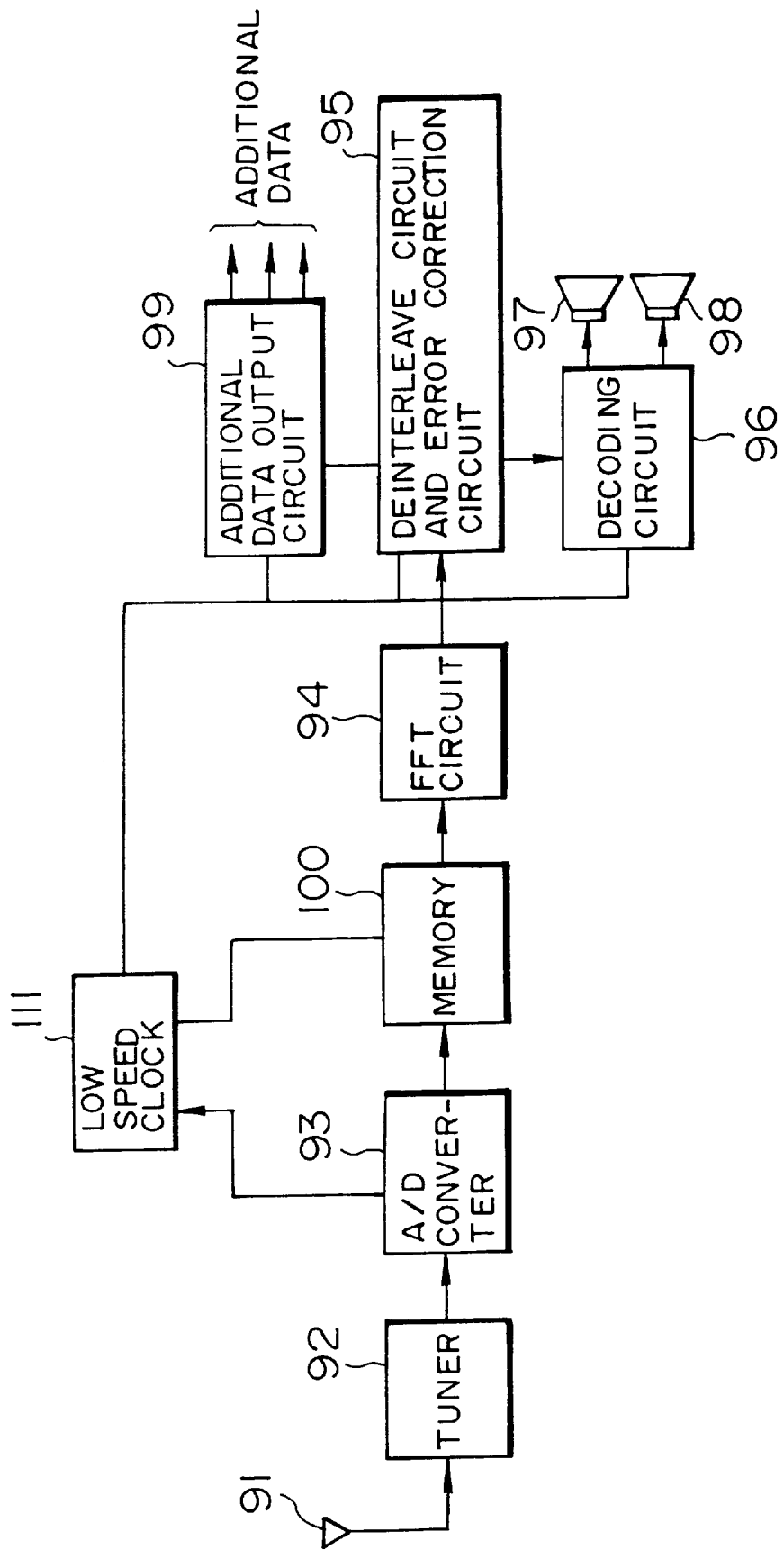
FIG. 18 is a block diagram illustrating an example of the construction of a receiving apparatus for DAB.
Figure 19:
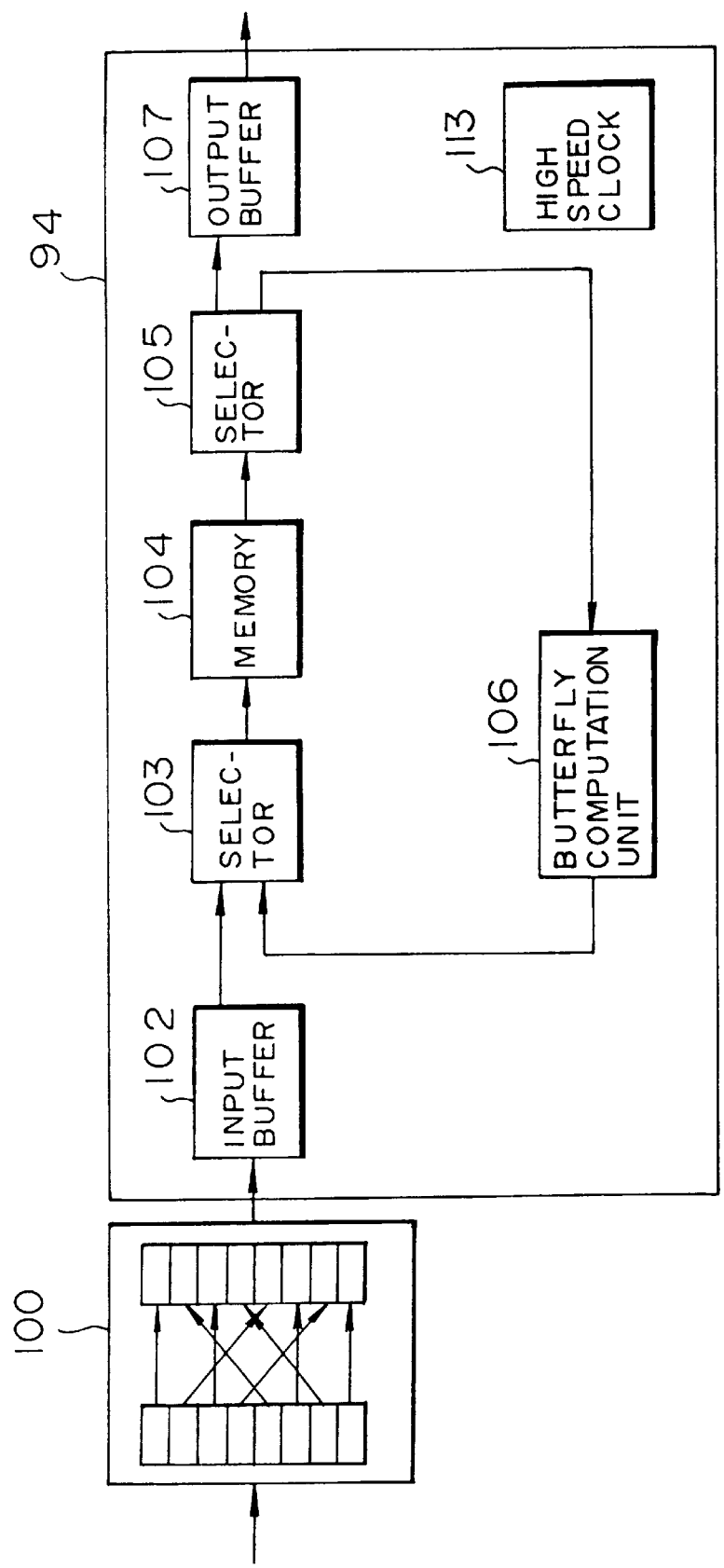
FIG. 19 is a block diagram illustrating an example of the construction of an FFT circuit 94 in FIG. 18, which is a conventional computation apparatus.
Figure 20:
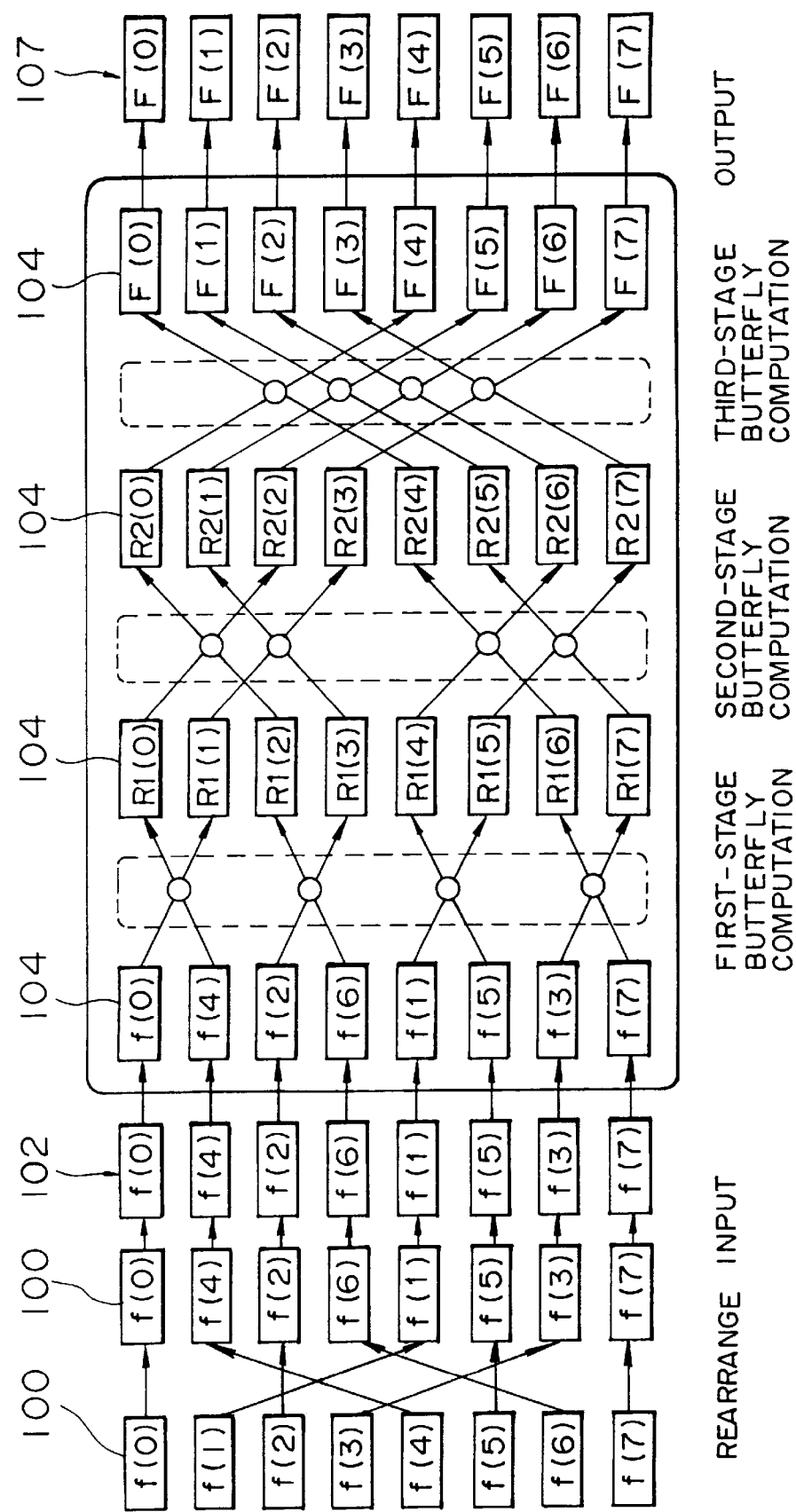
FIG. 20 shows a signal flow in the FFT circuit 94 in FIG. 19.

An input buffer 1 (also referred to as a first storage means or first storage section) temporarily stores incoming data supplied on a low-speed clock (e.g., the system clock 111 of the receiving apparatus in FIG. 18) from a predetermined circuit (e.g., the A/D converter 93 in FIG. 18). The apparatus operates on blocks of data. Each block, as supplied to input buffer 1, constitutes an ordered set of data as, for example, a sequence of digital values representing a sequence of amplitudes of the incoming signal as recovered by A/D converter 93 during successive sampling intervals within a period of time used for transmission a symbol component. As discussed below, the input buffer 1 outputs the data in a reverse-digit sequence in cooperation with a selector 2 in synchronization with a high-speed internal clock 13. That is, the input buffer 1 performs speed adjustments between a low-speed system clock of an external apparatus (e.g., the receiving apparatus in FIG. 18) and the high-speed internal clock of this apparatus.

As further described below, selector 2 stores data supplied from the input buffer 1 in a memory 4, also referred to as a second storage means or second storage section. Selector 2 stores data constituting the results of butterfly-computations from a butterfly computation unit 3 or computation means, in memory 4. Selector 5 fetches data from memory 4 and provides that data to butterfly computation unit 3.

The butterfly computation unit 3 operates in synchronism with a high-speed internal clock 13, appropriately reads rotational operator data stored in a built-in ROM, performs a butterfly computation on two units of data supplied from a selector 5 by using the data, and outputs two computational results to the selector 2, which returns the results to memory 4.

The memory 4 stores data during processing. As the butterfly computation operates, the input data is overwritten by intermediate results, which in turn are overwritten by later-stage intermediate results, and these in turn are overwritten by final results so that the input data is converted to an ordered set of final results or output data. Selector 5 reads data constituting the final results from memory 4 and transfers the data (without reordering) to an output buffer 6, also referred to as the third storage means or third storage section, in synchronization with high-speed internal clock 13.

The output buffer 6 temporarily stores the data transferred by selector 5 in synchronization with the high-speed internal clock. Output buffer 6 outputs the data to a predetermined circuit (e.g., the deinterleave circuit and error correction circuit 95 in FIG. 18) in synchronization with a low-speed clock such as the low speed system clock 111 of FIG. 18. That is, the output buffer 6 makes speed adjustments between the high-speed internal clock of this apparatus and a low-speed system clock of an external apparatus.

Figure 2:
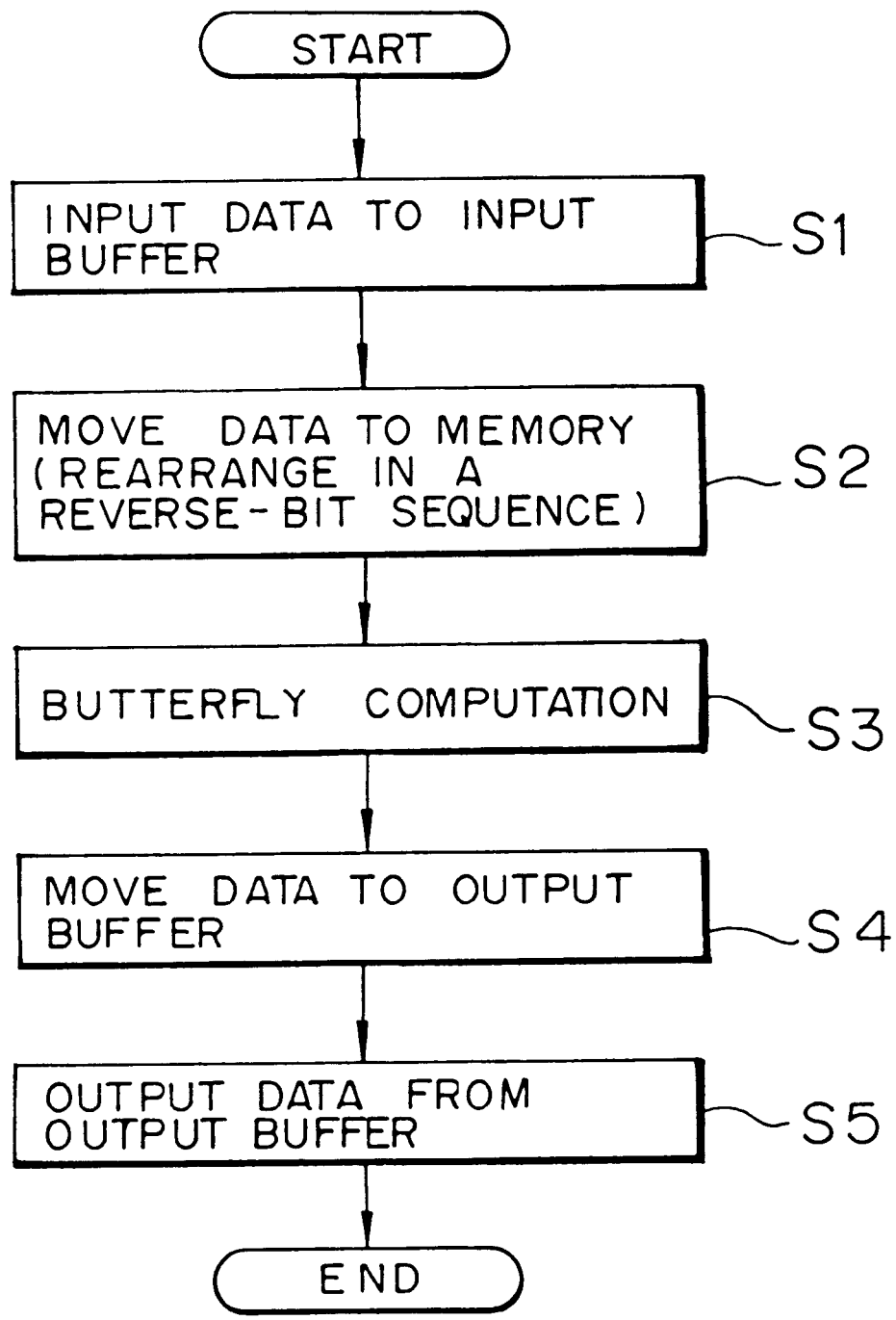
FIG. 2 is a flowchart illustrating the operation of the first embodiment shown in FIG. 1.

Next, referring to the flowchart of FIG. 2, and FIG. 3, the operation of the first embodiment will be described.

Figure 3:
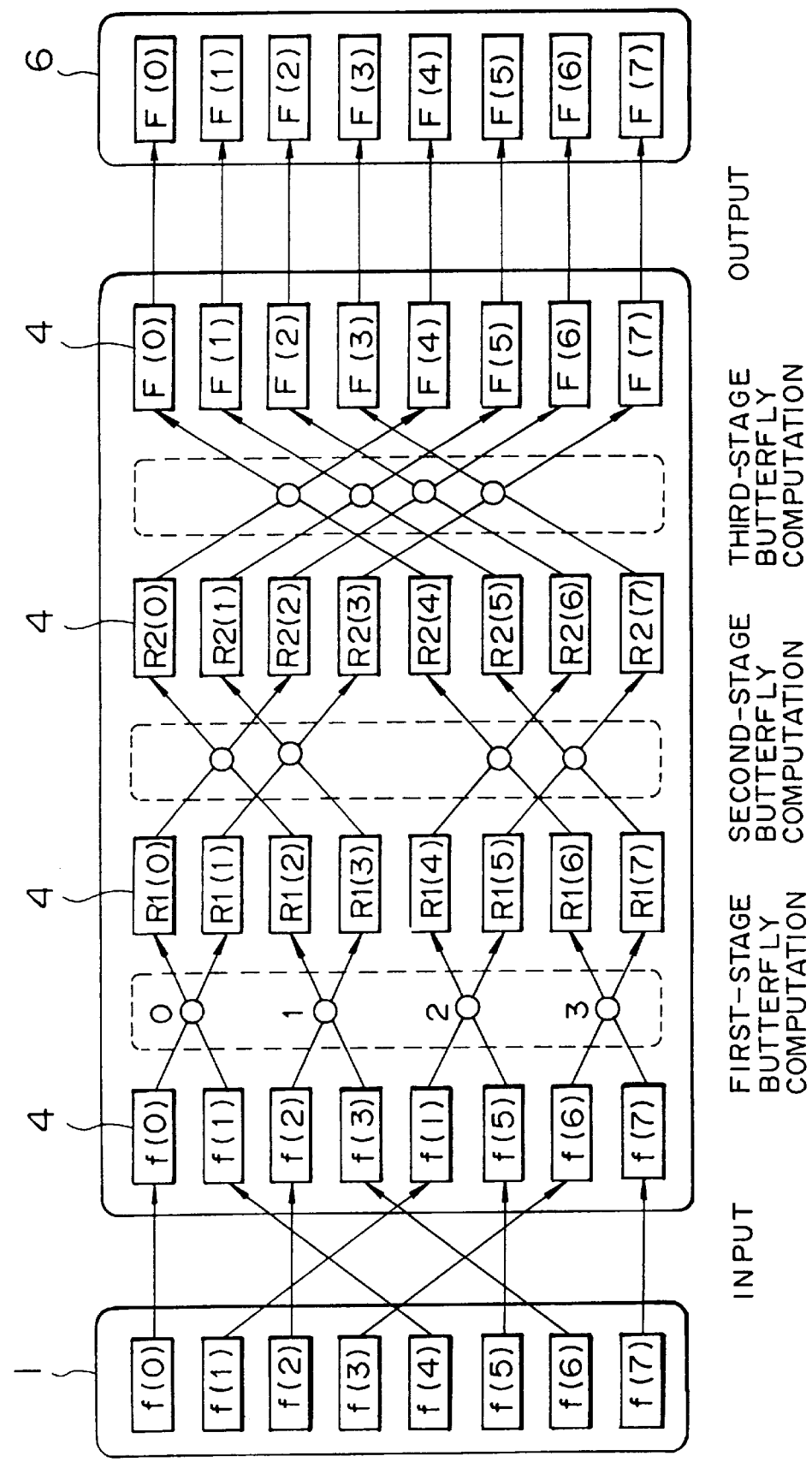
FIG. 3 shows a signal flow in the first embodiment when a time-thinning-type algorithm is used.

Initially, in step S1, the input buffer 1 stores data (data which is not rearranged in a reverse-digit sequence as shown in the leftmost side in FIG. 3) supplied on a low-speed clock and outputs the data in a reverse-digit sequence to the selector 2 in synchronization with the high-speed internal clock governing operation of the selector.

Figure 4:
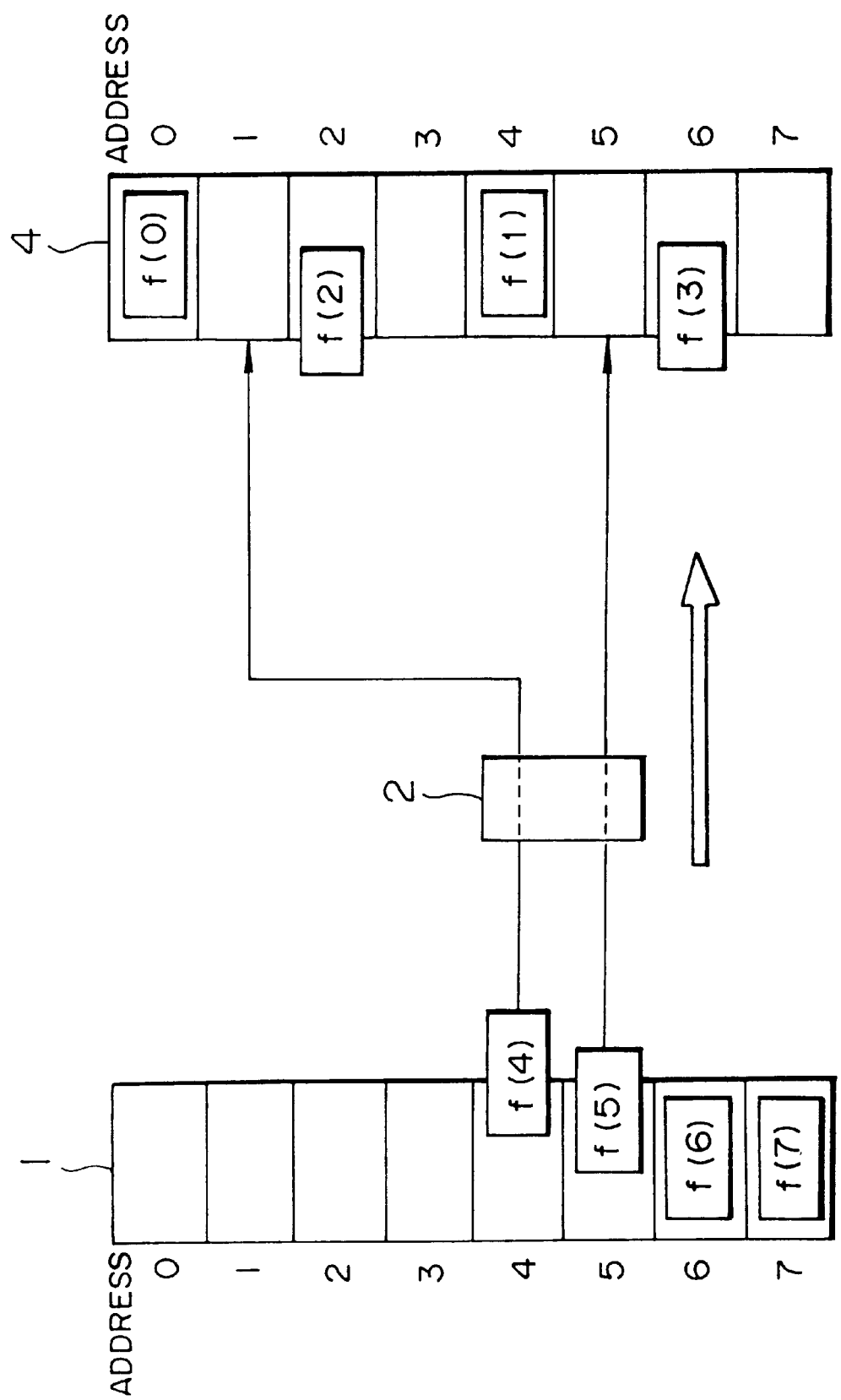
FIG. 4 shows the operation of a selector in the apparatus of FIG. 1.

Next, in step S2, the selector 2 stores the data supplied from the input buffer 1 in a reverse-digit sequence in the memory 4, as shown in FIG. 4.

Then, in step S3, the butterfly computation unit 3 performs butterfly computations in three stages on data stored in the memory 4 in sequence in synchronization with the high-speed internal clock as shown in FIG. 3.

Figure 5:
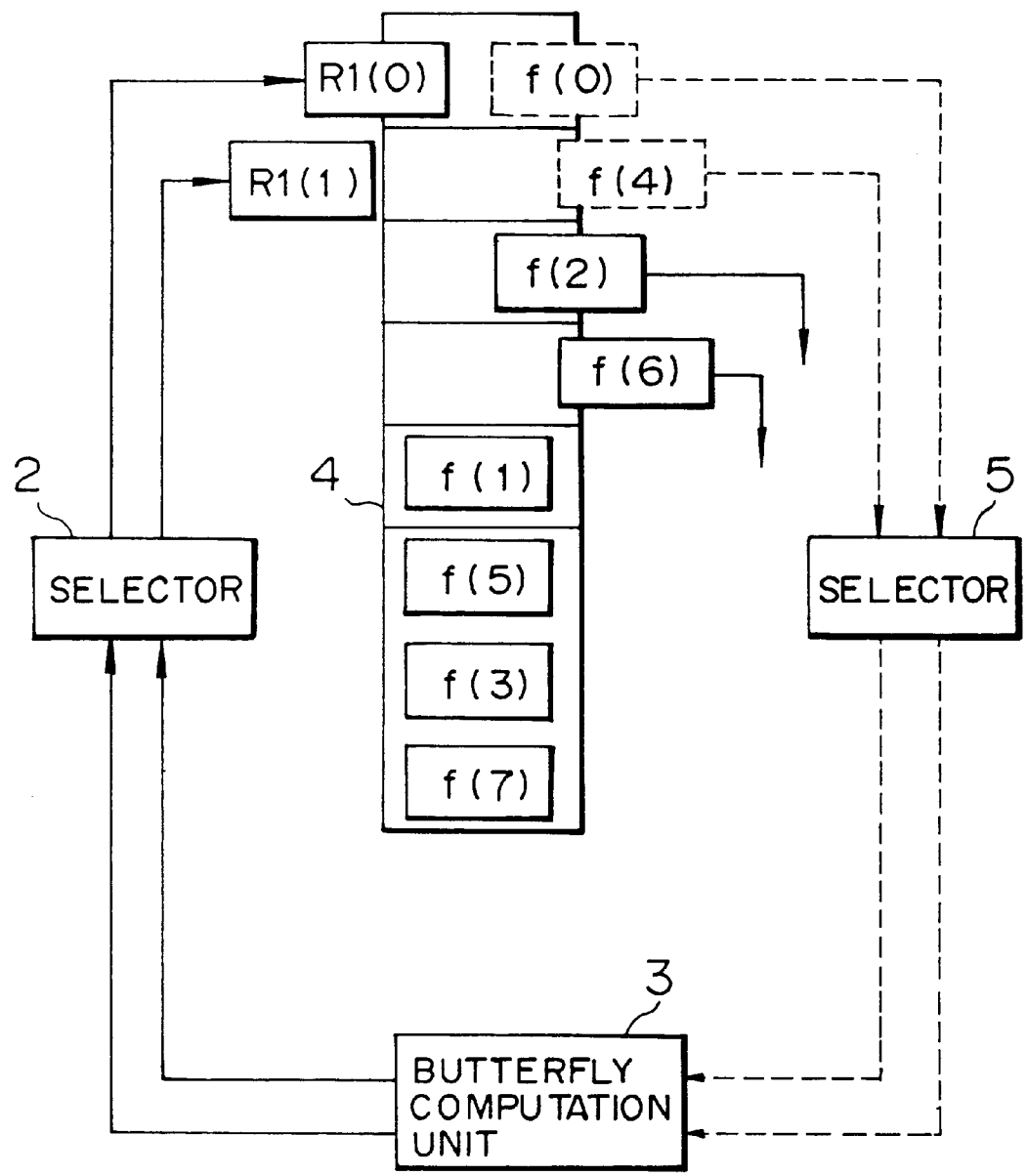
FIG. 5 shows an example of the flow of data in a butterfly computation.

FIG. 5 shows an example of the flow of data in the butterfly computation. Butterfly computation unit 3 operates cyclically. In each complete calculation cycle, the computation unit uses two input data values and returns two computational results. Thus, for each cycle of the computation unit, selector 5 reads data in groups of two in sequence from the memory 4 and supplies these data to the butterfly computation unit 3. The butterfly computation unit 3 performs a butterfly computation on these data and outputs the computational results to the selector 2. The selector 2 then stores the computational results at the address of the memory 4 where the data read out by the selector 5 as input data for the same cycle had been stored. That is, in this embodiment, data (computational results) is read from and written to the memory) 4 in accordance with an in-place method (a method for overwriting the computational results corresponding to the data onto the address at which the data has been stored).

Such butterfly computations are performed in sequence over three stages, as shown in FIG. 3. In the first-stage butterfly computation, a butterfly computation is performed on each of the 0-th data f(0) and 1st data f(4), the 2nd data f(2) and the 3rd data f(6), the 4-th data f(1) and the 5-th data f(5), and the 6-th data f(3) and the 7-th data f(7).

In the second-stage butterfly computation, a butterfly computation is performed on each of the 0-th data R1(0) and the 2nd data R1(2), the 1st data R1(1) and the 3rd data R1(3), the 4-th data R1(4) and the 6-th data R1(6), and the 5-th data R1(5) and the 7-th data R1(7).

In the third-stage butterfly computation, a butterfly computation is performed on each of the 0-th data R2(0) and the 4-th data R2(4), the 1st data R2(1) and the 5-th data R2(5), the 2nd data R2(2) and the 6-th data R2(6), and the 3rd data R2(3) and the 7-th data R2(7).

Next, in step S4, the selector 5 reads the final data F(0) to F(7), which are the computational results of the third-stage butterfly computation, from the memory 4 and stores the data in the output buffer 6 in the same sequence in synchronization with the high-speed clock.

Then, in step S5, the output buffer 6 outputs the data to a predetermined circuit in synchronization with the low-speed clock.

Figure 6:
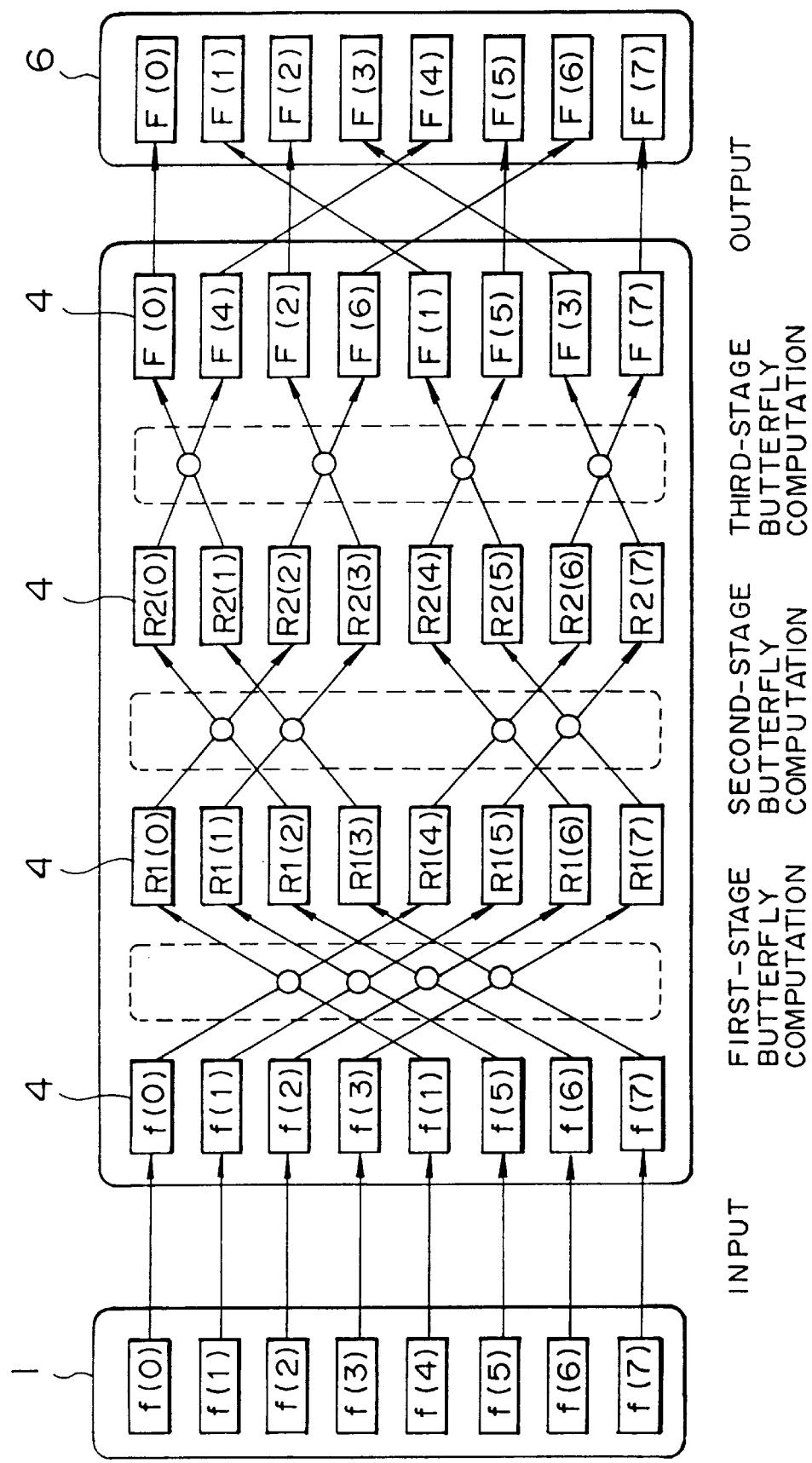
FIG. 6 shows a signal flow in the first embodiment when a frequency-thinning-type algorithm is used.

In this way, an FFT process is performed by rearranging the data in a reverse-digit sequence when data is moved from the input buffer 1 to the memory 4 and by performing a butterfly computation on the data. Thus, the process of transferring the data from the input buffer in synchronism with the high-speed clock, which required to compensate for the difference in clock speeds, also serves to reorder the data. Although in the above-described embodiment data is rearranged in a reverse-digit sequence when data is moved from the input buffer 1 to the memory 4, the data may be rearranged in a reverse-digit sequence when data is moved from the memory 4 to the output buffer 6, as described below with reference to FIGS. 6 and 7.

The above-described operation is an operation of a case in accordance with a time-thinning-type algorithm. Next, an operation of a case in accordance with a frequency-thinning-type algorithm will be described with reference to FIGS. 6 and 7. In this embodiment, selector 2 reads data from the input buffer 1 and stores it in an as-is sequence without rearranging the data to a reverse-digit sequence.

Then, in the first-stage butterfly computation of the three-stage butterfly computation, a butterfly computation is performed on each of the 0-th data f(0) and the 4-th data f(4), the 1st data f(1) and the 5-th data f(5), the 2nd data f(2) and the 6-th data f(6), and the 3rd data f(3) and the 7-th data f(7).

In the second-stage butterfly computation, a butterfly computation is performed on each of the 0-th data R1(0) and the 2nd data R1(2), the 1st data R1(1) and the 3rd data R1(3), the 4-th data R1(4) and the 6-th data R1(6), and the 5-th data R1(5) and the 7-th data R1(7).

In the third-stage butterfly computation, a butterfly computation is performed on each of the 0-th data R2(0) and the 1st data R2(1), the 2nd data R2(2) and the 3rd data R2(3), the 4-th data R2(4) and the 5-th data R2(5), and the 6-th data R2(6) and the 7-th data R2(7).

Figure 7:
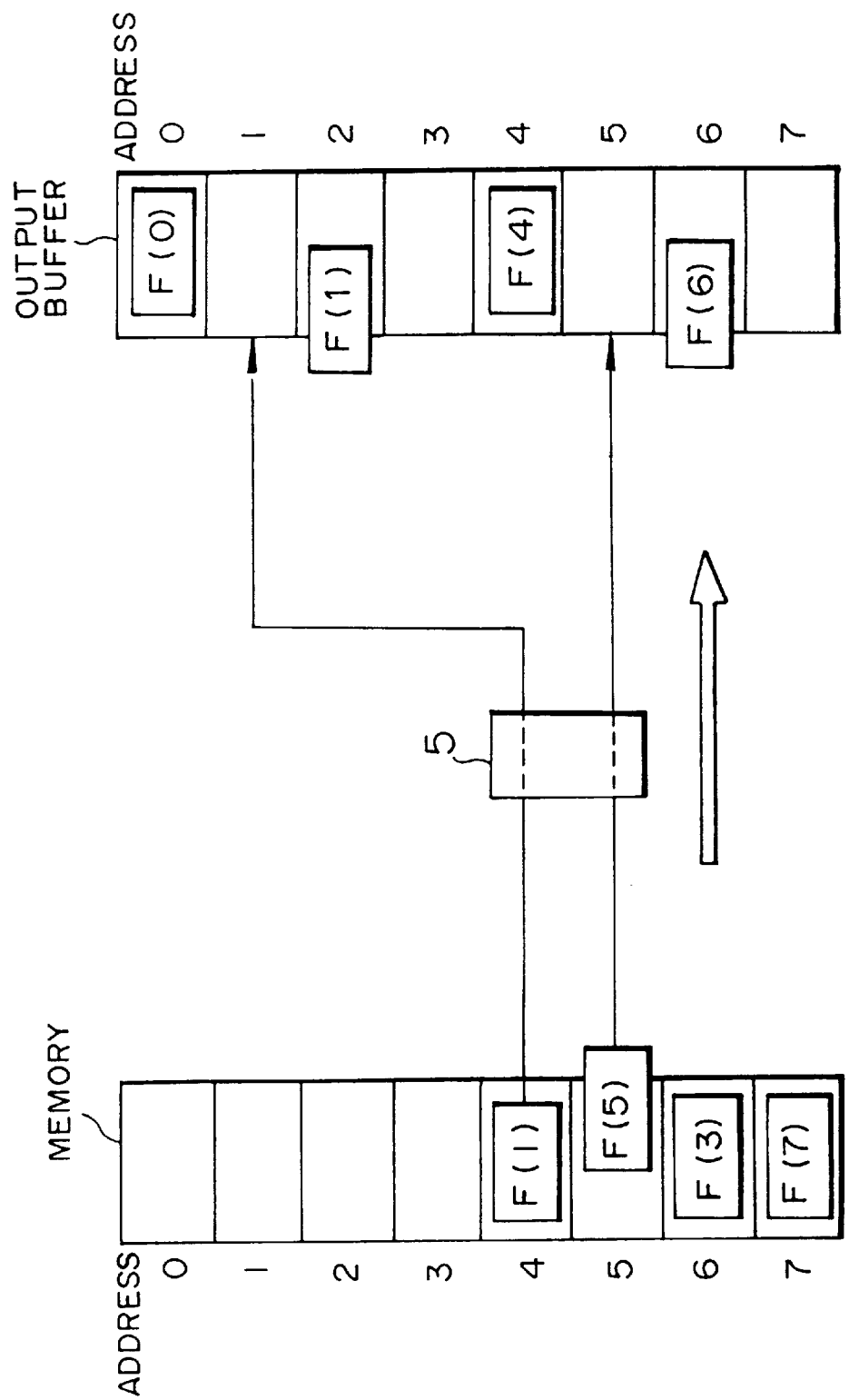
FIG. 7 shows the operation of a selector in the apparatus of FIG. 1.

After the three-stage butterfly computation is terminated, the selector 5, as shown in FIG. 7, reads data F(0), F(4), F(2), F(6), F(1), F(5), F(3), and F(7), which are the computational results of the third-stage butterfly computation, from the memory 4, and stores the data in the output buffer 6 in a reverse-digit sequence (i.e., in the sequence of F(0), F(1), . . . , F(7)).

When data is moved from the memory 4 to the output buffer 6 by selector 5 after the three-stage butterfly computation is terminated, the data is rearranged in a reverse-digit sequence, as depicted in FIG. 7. Although in the above-described embodiment data is rearranged in a reverse-digit sequence when the data is moved from the memory 4 to the output buffer 6, the data may be rearranged in a reverse-digit sequence when the data is moved from the input buffer 1 to the memory 4.

Figure 8:
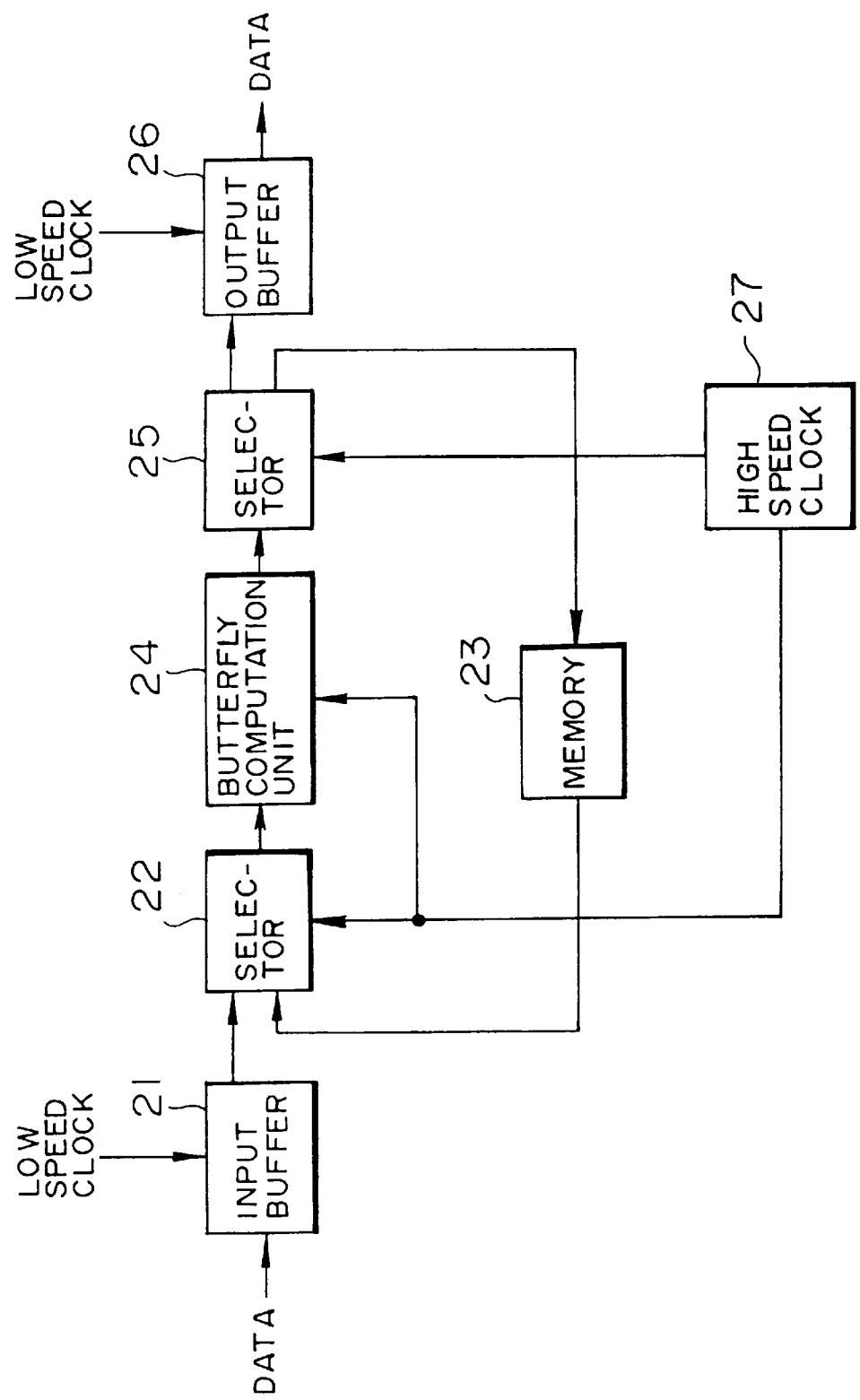
FIG. 8 is a block diagram illustrating the construction of a further embodiment of a computation apparatus of the present invention.

FIG. 8 shows the construction of a further embodiment of a computation apparatus of the present invention. Similar to the embodiments discussed above, this embodiment is, for example, an FFT computation apparatus used in place of the memory 100 and the FFT circuit 94 in the receiving apparatus in FIG. 18.

An input buffer 21, also referred to as a first storage means or first storage section, temporarily stores data supplied on a low-speed clock (e.g., the system clock 111 of the receiving apparatus in FIG. 18) from a predetermined circuit (e.g., the A/D converter 93 in FIG. 18), and outputs the data to a selector 22 in synchronization with an internal high-speed internal clock 27. That is, the input buffer 21 makes speed adjustments between the low-speed system clock of an external apparatus (e.g., the system clock 111 of the receiving apparatus in FIG. 18) and the high-speed internal clock 27 of this apparatus.

The selector 22 reads, as data on which butterfly computations are performed, data of the sequence in a reverse-digit sequence corresponding to the sequence of the data from the input buffer 21, and outputs it to a butterfly computation unit 24.

Further, the selector 22 reads two units of data from a memory or second storage means 23 and supplies such data to the butterfly computation unit 24.

The memory 23 stores data during processing.

The butterfly computation unit 24 in a manner similar to the computation unit of the other embodiments discussed above. Here again, the computation unit operates on a high-speed internal clock, appropriately reads rotational operator data stored in a built-in ROM, and performs a butterfly computation on the data supplied by selector 22 and produces computational results.

A selector 25 stores the two units of data (the computational results) computed by the butterfly computation unit 24 in the first and second stages of computation. The second-stage computational results from each butterfly computation are stored at the address of the memory 23 where the two units of used as inputs to that computation were previously stored, using an in-place or overwriting method similar to that discussed above.

Further, the selector 25 outputs the final data computed by the butterfly computation unit 24 in the last stage of computation to an output buffer 26, also referred to as a third storage means or third storage section. Selector 25 performs this operation in synchronization with high-speed internal clock 27. Selector 25 does not reorder the final output data during transfer to output buffer 26.

Output buffer 26 temporarily stores the data supplied the selector 25 in synchronization with a high-speed internal clock and outputs it to a predetermined circuit (e.g., the deinterleave circuit and error correction circuit 95 in FIG. 18) in synchronization with a low-speed clock. That is, the output buffer 26 makes speed adjustments between the high-speed internal clock of this apparatus and the low-speed system clock of an external apparatus (e.g., the receiving apparatus in FIG. 18).

Figure 9:
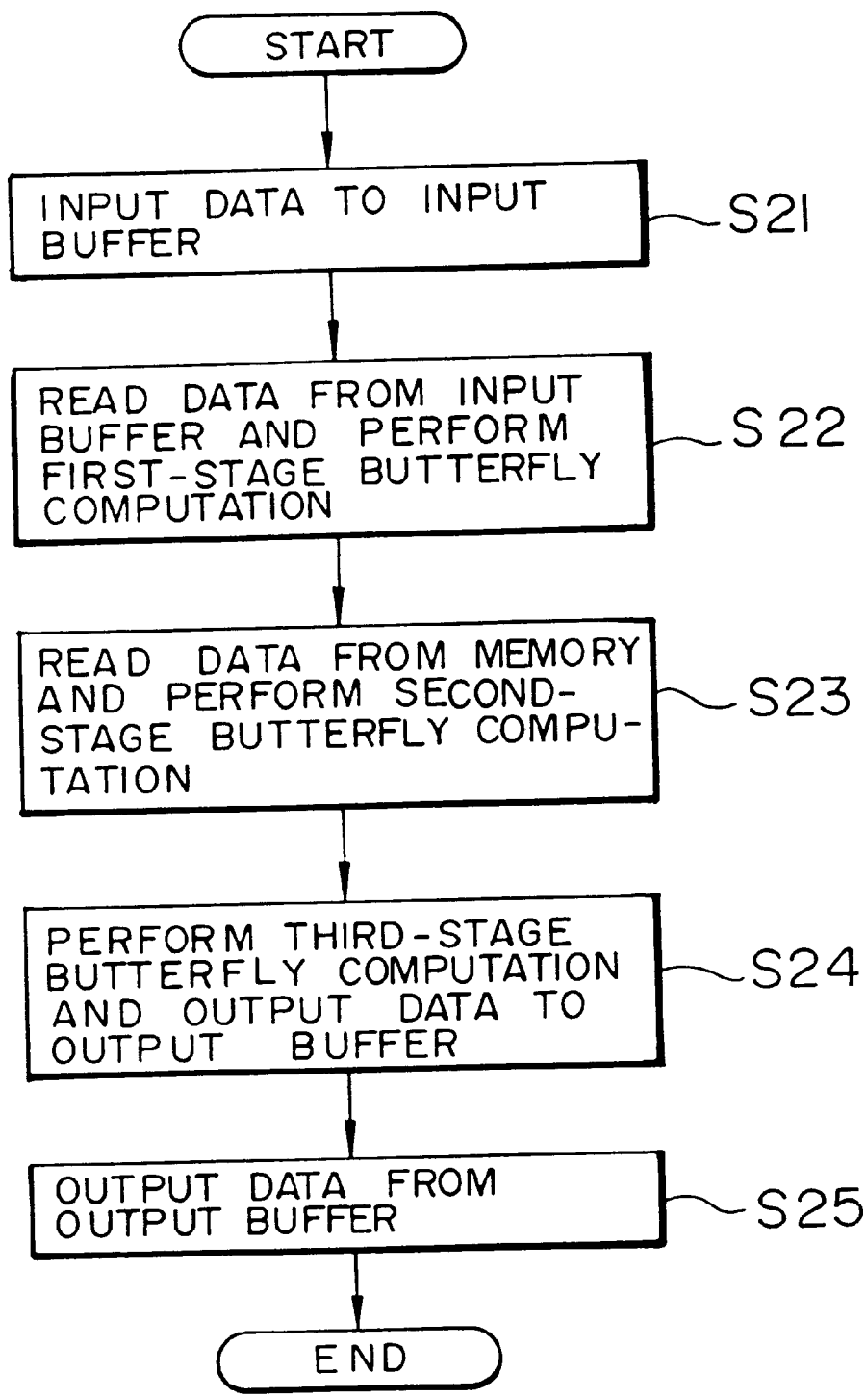
FIG. 9 is a flowchart illustrating the operation of the apparatus depicted in FIG. 8.

Operation of this embodiment will be described with reference to the flowchart of FIG. 9, and FIGS. 10 and 11.

Initially, in step S21, the input buffer 21 stores an ordered set of data as supplied in synchronism with the low-speed clock. Buffer 21 stores the data in its original sequence, as shown in the leftmost side in FIG. 10. Selector 22, operating in synchronization with the high-speed internal clock 27, transfers the ordered set of data from buffer 21 to computation unit 24 in a reordered sequence. The reordered sequence corresponds to the reverse-digit sequence of the original ordered set. For example, the two items of data transferred from input buffer 21 to computation unit 24 for the first butterfly computation of the first stage are the 0-th data f(0) and the 4-th data f(4), i.e., the first two items of data in the reverse-sequence reordering of the original ordered set.

In step S22, a first-stage butterfly computation is performed on the supplied data. The selector 22, as shown in FIGS. 10 and 11, outputs the further data from the input buffer 21 to the butterfly computation unit 24, in the reordered sequence. The data produced by the butterfly computation unit 24 is stored in the memory 23 via the selector 25. These operations are performed in synchronization with the high-speed internal clock.

Figure 10:
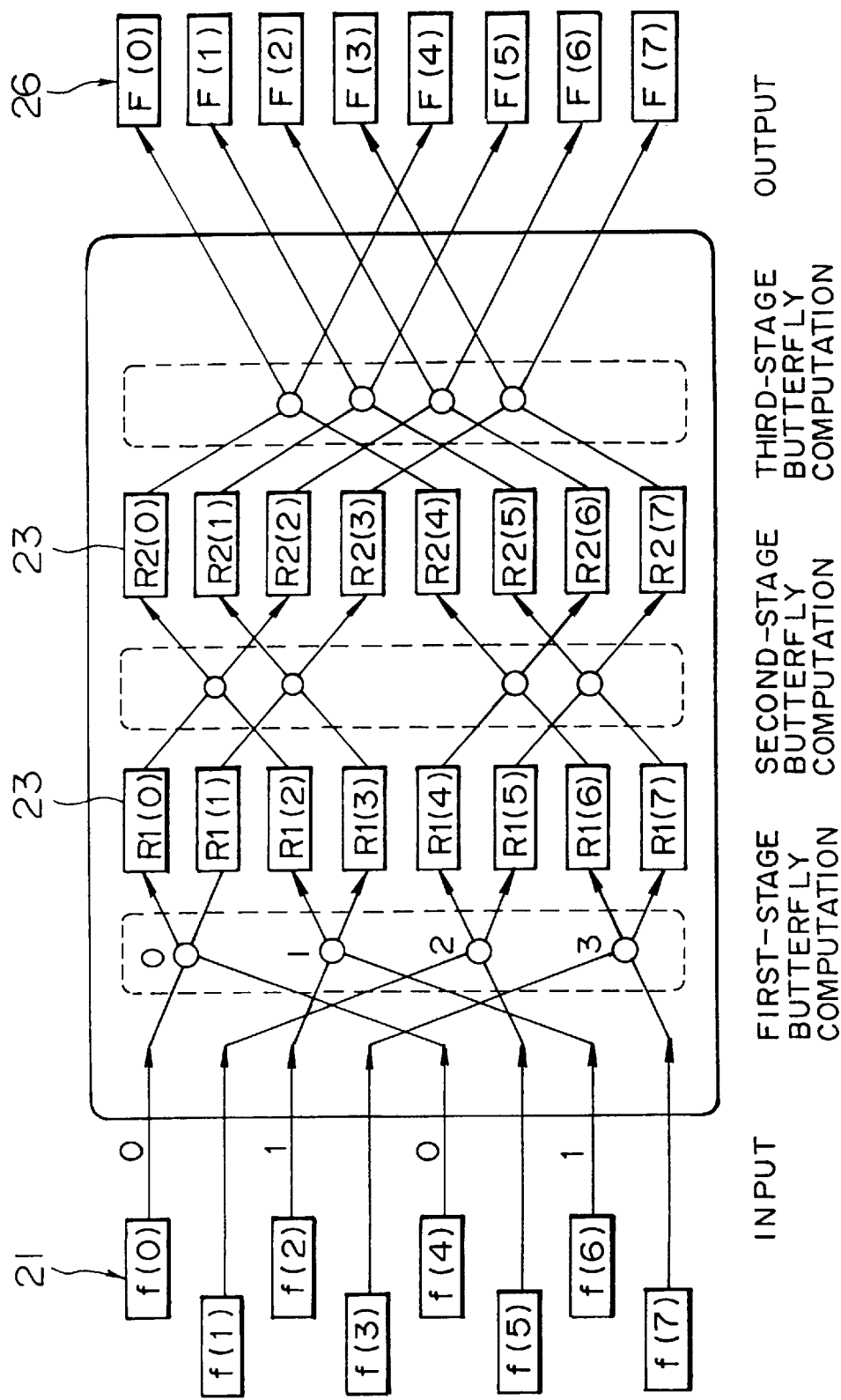
FIG. 10 shows a signal flow in the apparatus of FIG. 8 when a time-thinning-type algorithm is used.

More specifically, as shown in FIG. 10, the 0-th data f(0) and the 4th data f(4) of the input buffer 21 are read out, a butterfly computation is performed thereon, and the computational results are stored as the first stage computational result data R1(0) and the first stage computational result data R1(1) of the memory 23.

Figure 11:
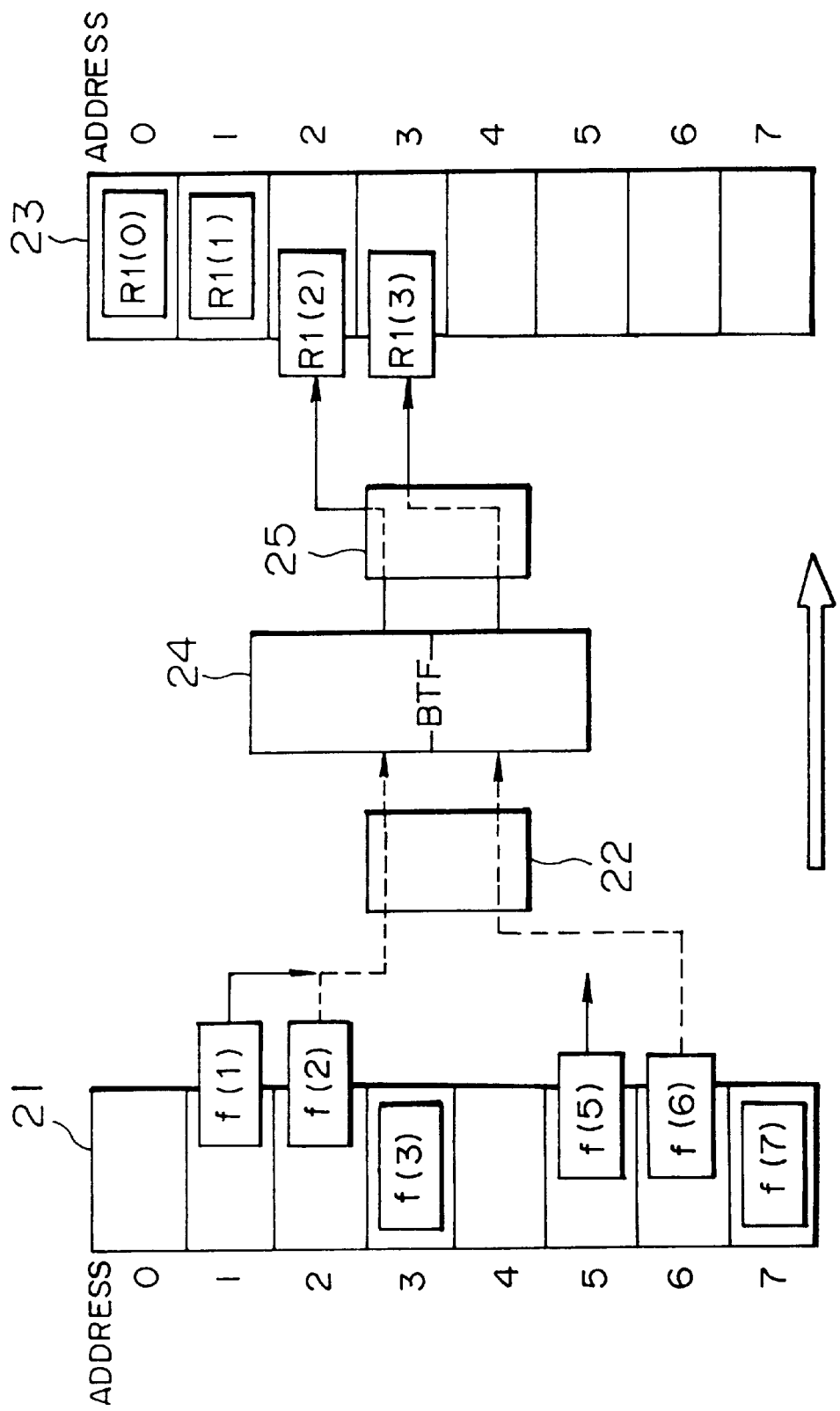
FIG. 11 shows the operation of selectors in the apparatus depicted in FIG. 8 when a time-thinning-type algorithm is used.

Next, as shown in FIGS. 10 and 11, the 2nd data f(2) and the 6-th data f(6) of the input buffer 21 are read out, a butterfly computation is performed thereon, and the computational results are stored as the 2nd data R1(2) and the 3rd data R1(3) of the memory 23.

Then, the 1st data f(1) and the 5-th data f(5) of the input buffer 21 are read out, a butterfly computation is performed, and the computational results are stored as the 4-th data R1(4) and the 5-th data R1(5) of the memory 23.

Finally, the 3rd data f(3) and the 7-th data f(7) of the input buffer 21 are read out, a butterfly computation is performed thereon, and the computational results are stored as the 6-th data R1(6) and the 7-th data R1(7) of the memory 23.

Next, in step S23, a second-stage butterfly computation is performed. The selector 22 reads two units of the first stage computational result data from the memory 23 and supplies these data to the butterfly computation unit 24. Then, the butterfly computation unit 24 performs a butterfly computation on these data and outputs the computational results to the selector 25. The selector 25 stores the second-stage computational results at the address of the memory 23 where the data used to produce those computational results had been stored.

In the second-stage butterfly computation, a butterfly computation is performed on each of the 0-th data R1(0) and the 2nd data R1(2), the 1st data R1(1) and the 3rd data R1(3), the 4-th data R1(4) and the 6-th data R1(6), and the 5-th data R1(5) and the 7-th data R1(7).

Then, in step S24, a third-stage butterfly computation is performed. The selector 22 reads two units of data of the second-stage computational result data memory 23 and supplies these data to the butterfly computation unit 24. The butterfly computation unit 24 then performs a butterfly computation on these data and outputs the computational results to the selector 25. The selector 25 stores the final or third-stage computational results in the output buffer 26 in the same sequence as the second-stage computational result data supplied to the computational unit. Thus, the final computational results are stored by selector 25 in the output buffer without reordering.

For example, the third-stage butterfly computation, a butterfly computation is performed on the 0-th second stage computational result data R2(0) and the 4-th second stage computational result data R2(4). The final computational results F(0) and F(4) obtained by this computation are stored in the 0-th and 4-th places, respectively, of output buffer 26. A butterfly computation is performed on the 1st data R2(1) and the 5-th data R2(5), and the computational results F(1) and F(5) are stored in the output buffer 26. Further, a butterfly computation is performed on the 2nd data R2(2) and the 6-th data R2(6), the computational results F(2) and F(6) are stored in the output buffer 26, a butterfly computation is performed on the 3rd data R2(3) and the 7-th data R2(7), and the computational results F(3) and F(7) are stored in the output buffer 26.

Then, in step S25, the output buffer 26 outputs the data to a predetermined circuit in synchronization with the low-speed clock.

In the operations described with reference to FIGS. 9 through 11, the input buffer 21 outputs data to computation unit 24 through selector 22. The data is transferred from the input buffer in a reverse-digit sequence. An FFT process is performed on the data.

The above-described operation is an operation of a case in accordance with a time-thinning-type algorithm. Next, an operation in accordance with a frequency-thinning-type algorithm will be described with reference to FIGS. 12 and 13. In this frequency-thinning operation embodiment the data is reordered or rearranged to a reverse-digit sequence when the data is transferred to output buffer 26, instead of when the data is transferred from input buffer 21.

Selector 22 reads two units of data on which a first-stage butterfly computation is to be performed from the input buffer 21 and outputs it to the butterfly computation unit 24. In the first-stage butterfly computation in the frequency-thinning-type algorithm, a butterfly computation is performed on each of the 0-th data f(0) and the 4-th data f(4), the 1st data f(1) and the 5-th data f(5), the 2nd data f(2) and the 6-th data f(6), and the 3rd data f(3) and the 7-th data f(7). Thus, the data is transferred by selector 22 from input buffer 21 to computation unit 24 in an order close to the original order of the data supplied to input buffer 21, i.e., 0-th, 4-th, 1st, 5-th, 2nd, 6-th, and 3rd, 7-th.

In the second-stage butterfly computation, a butterfly computation is performed on each of the 0-th first stage computation result data R1(0) and the 2nd data R1(2), the 1st data R1(1) and the 3rd data R1(3), the 4-th data R1(4) and the 6-th data R1(6), and the 5-th data R1(5) and the 7-th data R1(7).

Figure 13:
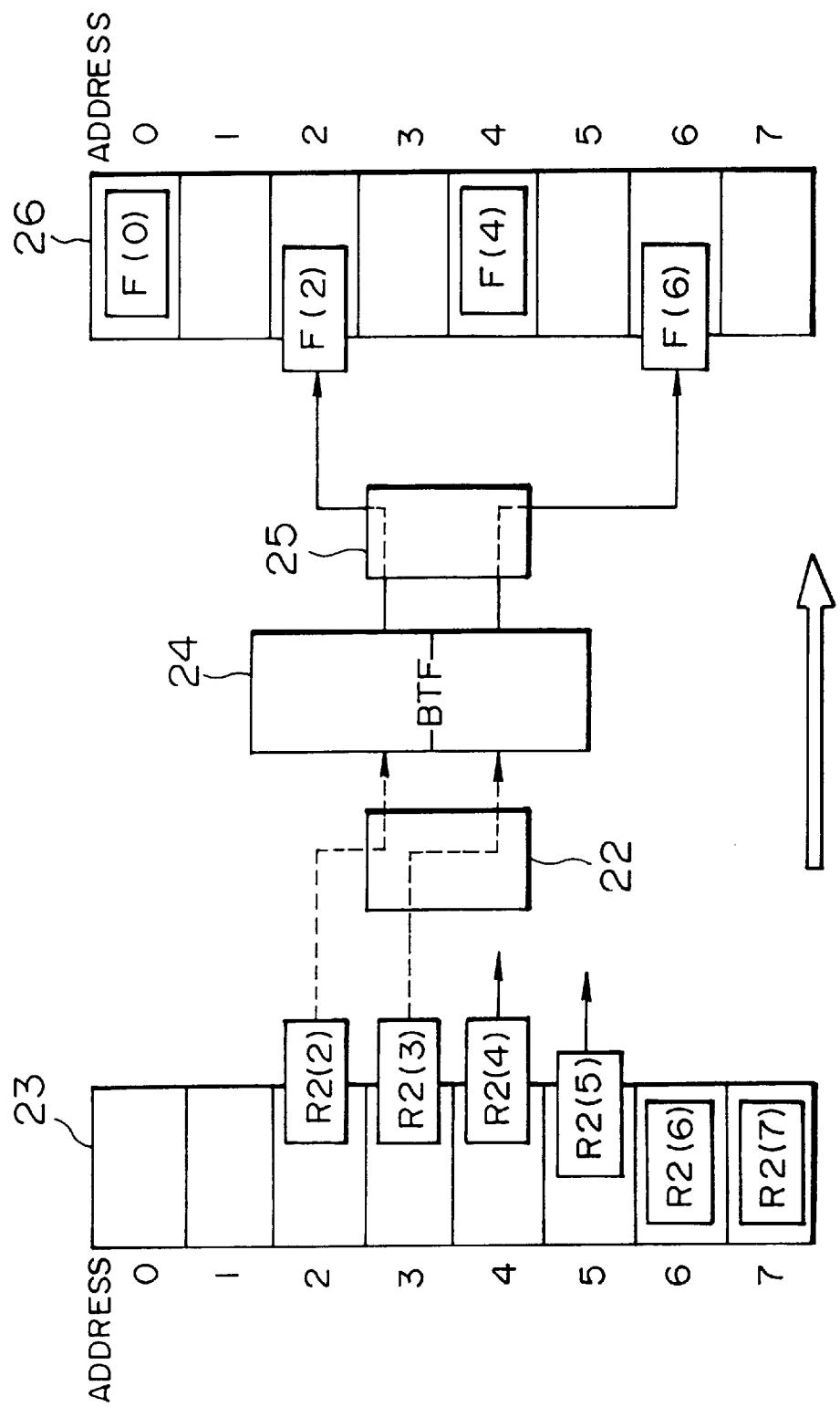
FIG. 13 shows the operation of selector in the apparatus of FIG. 8 when a frequency-thinning-type algorithm is used.

In the third-stage butterfly computation, as shown in FIG. 13, a butterfly computation is performed on the 0-th second stage computation result data R2(0) and the 1st data R2(1), and the computational results are stored in a reverse-digit sequence as the 0-th data F(0) and the 4-th data F(4) in the output buffer 26. A butterfly computation is performed on the 2nd data R2(2) and the 3rd data R2(3), and the computational results are stored in a reverse-digit sequence as the 2nd data F(2) and the 6-th data F(6) in the output buffer 26.

Further, a butterfly computation is performed on the 4-th data R2(4) and the 5-th data R2(5), and the computational results are stored in a reverse-digit sequence as the 1st data F(1) and the 5-th data F(5) in the output buffer 26. A butterfly computation is performed on the 6-th data R2(6) and the 7-th data R2(7), and the computational results are stored in a reverse-digit sequence as the 3rd data F(3) and the 7-th data F(7) in the output buffer 26.

Figure 12:
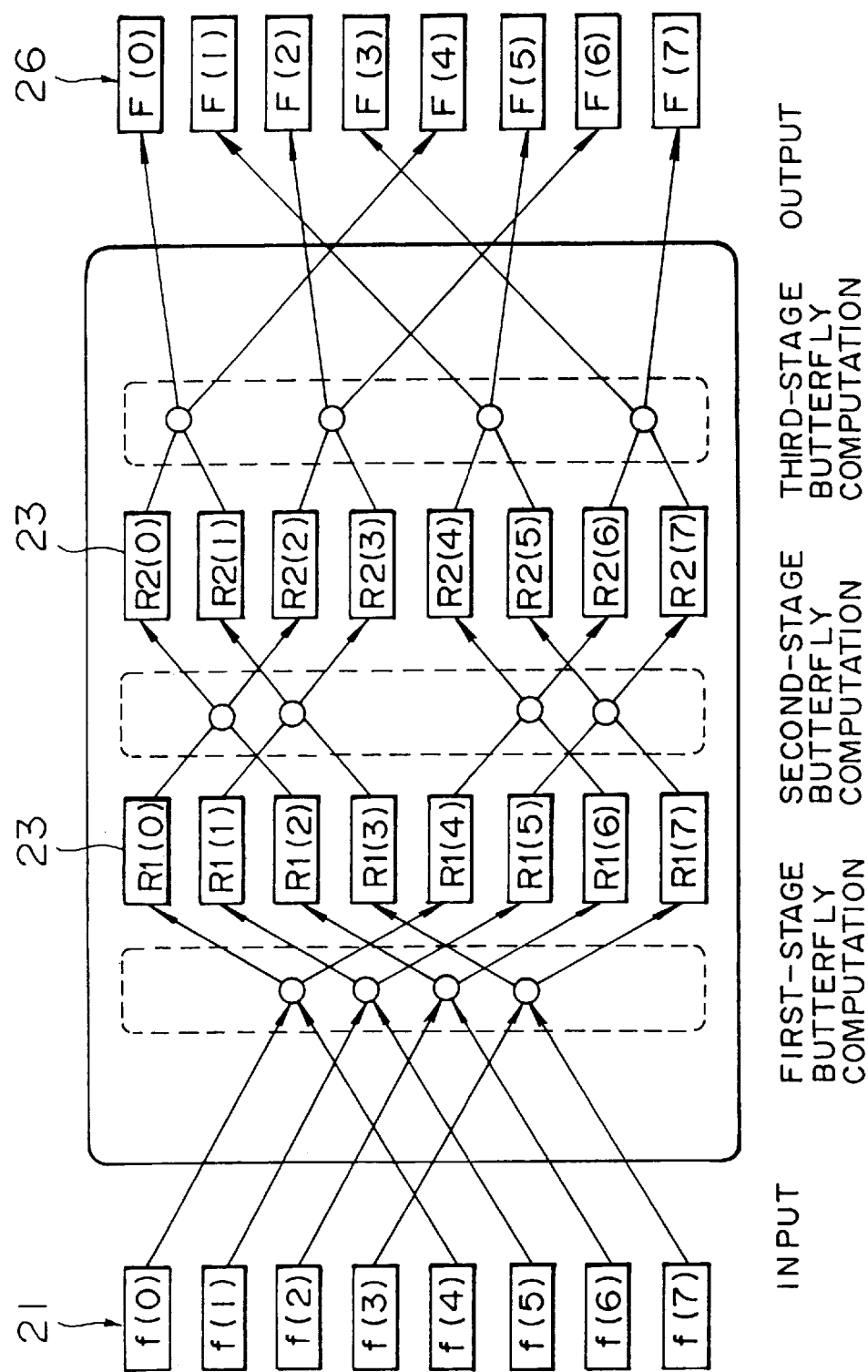
FIG. 12 shows a signal flow in the apparatus of FIG. 8 when a frequency-thinning-type algorithm is used.

In this way, when the results of the third-stage butterfly computation are transferred to the output buffer 26 by selector 25 and stored in the output buffer, the data is rearranged in a reverse-digit sequence. Stated another way, the final computational results are stored in reverse-digit sequence relative to the second stage-computational results. The data is reordered by the cooperative action of the computation unit 24 and selector 25. In the embodiment of FIGS. 12 and 13, the data are rearranged in a reverse-digit sequence when the computational results are stored in the output buffer 26. Alternatively, the input buffer 21 may instead output data of the sequence in a reverse-digit sequence to the butterfly computation unit 24.

As described above, when data is supplied from the input buffer 21 to the butterfly computation unit 24, or when the third-stage computational results are output from the butterfly computation unit 24 to the output buffer 26, the data is rearranged in a reverse-digit sequence. Thus, it is possible to perform an FFT process more quickly.

The operation of a further embodiment, which also uses the apparatus elements depicted in FIG. 8, is described below with reference to FIGS. 14 and 15. This embodiment differs from the embodiment discussed above with reference to FIGS. 9–11 in that in the embodiment of FIGS. 14 and 15, the process of transferring data from input buffer 21 begins before all of the data has been written into the input buffer. Here again, the data is written into the input buffer in synchronism with the low-speed clock, such as the system clock 111 (FIG. 18). The data is clocked into the input buffer in order, so that the lowest-ordered data is written into the buffer first. When a part of the ordered set of data constituting more than half of all the data has been written into the input buffer (in this case, data f(0) to f(4)), so that the preselected data elements f(0) and f(4) needed for the first butterfly computation are present in the input buffer, the process of transferring the data from input buffer 21 through selector 22 begins. In the first such transfer, preselected elements f(0) and f(4) are transferred to computation unit 24.

Here again, the butterfly computation unit 24 performs a first-stage butterfly computation on the data transferred from input buffer 21 by selector 22. As shown in FIG. 15, the input buffer 21 outputs data to computation unit 24 via the selector 22 in a reordered sequence relative to the original ordered set of data. That is, in this embodiment, the input buffer 21 and selector 22 transfer data f(0) to f(7) in the sequence of f(0) and f(4), f(1) and f(5), f(2) and f(6), and f(3) and f(7).

The data processed by the butterfly computation unit 24 is stored in the memory 23 via the selector 25.

Initially, the 0-th data f(0) and the 4-th data f(4) of the input buffer 21 are read out, a butterfly computation is performed thereon, and the computational results are stored as the 0-th first stage computational result data R1(0) and the 1st data R1(1) in the memory 23.

Figure 14:
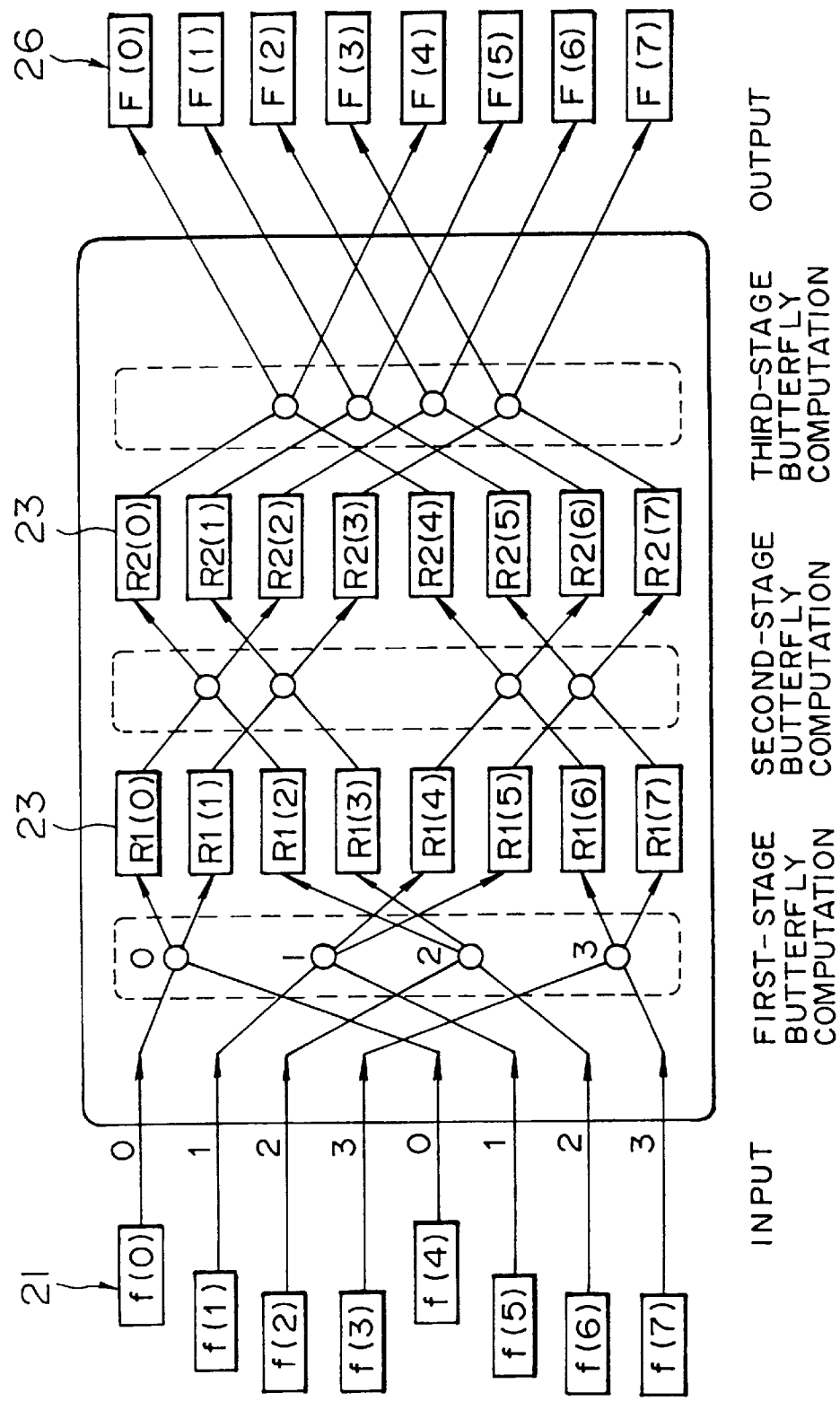
FIG. 14 shows a further signal flow in the apparatus of FIG. 8 when a time-thinning-type algorithm is used.
Figure 15:
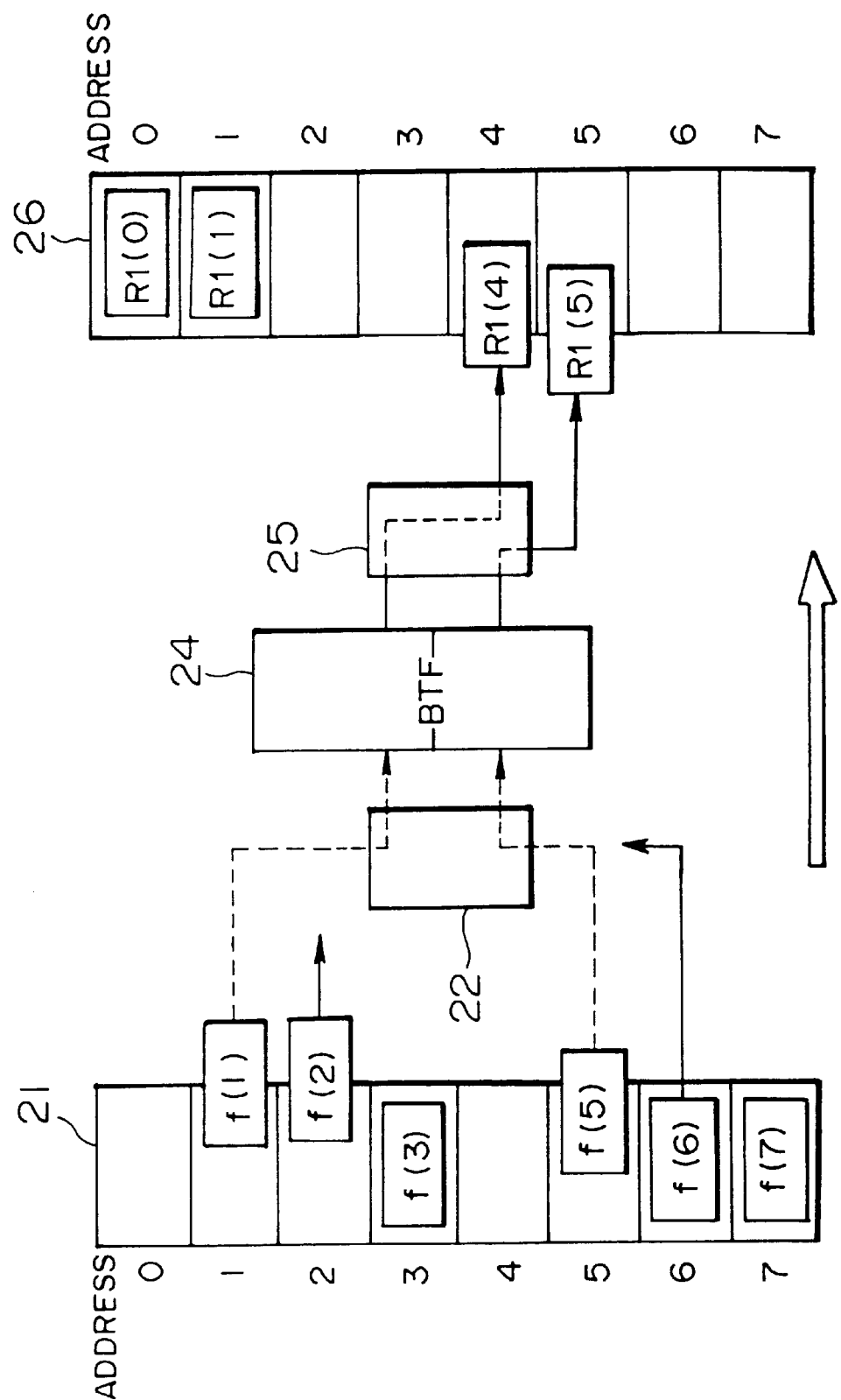
FIG. 15 shows the operation of the selectors in the apparatus of FIG. 8 in the signal flow of FIG. 14.

Next, as shown in FIG. 14, the 1st data f(1) and the 5-th data f(5) are read out of the input buffer 21, a butterfly computation is performed thereon, and the computational results are stored as the 4-th data R1(4) and the 5-th data R1(5) of the memory 23.

Then, the 2nd data f(2) and the 6-th data f(6) are read out of the input buffer 21, a butterfly computation is performed thereon, and the computational results are stored as the 2nd first stage computation result data R1(2) and the 3rd data R1(3) of the memory 23.

Finally, the 3rd data f(3) and the 7-th data f(7) 21 are read out of the input buffer, a butterfly computation is performed thereon, and the computational results are stored as the 6-th first stage computation result data R1(6) and the 7-th data R1(7) of the memory 23.

The second-stage butterfly computation, the third-stage butterfly computation, and the output of data to the output buffer 26 are the same as those discussed above with reference to FIGS. 9–11, and therefore, a description thereof is omitted.

As a result of the above, when data comprising more than half of all the data is supplied to the input buffer 21, the process is started, and the process is carried out in sequence. The computation unit can commence operation before the input buffer is completely filled. Therefore, it is possible to decrease the wait time (system delay) during input of data and to perform an FFT process at a high speed. Here again, the data can be reordered in a reverse-digit sequence when the data is output to the output buffer 26 rather than when the data is transferred from input buffer 21.

Figure 16:
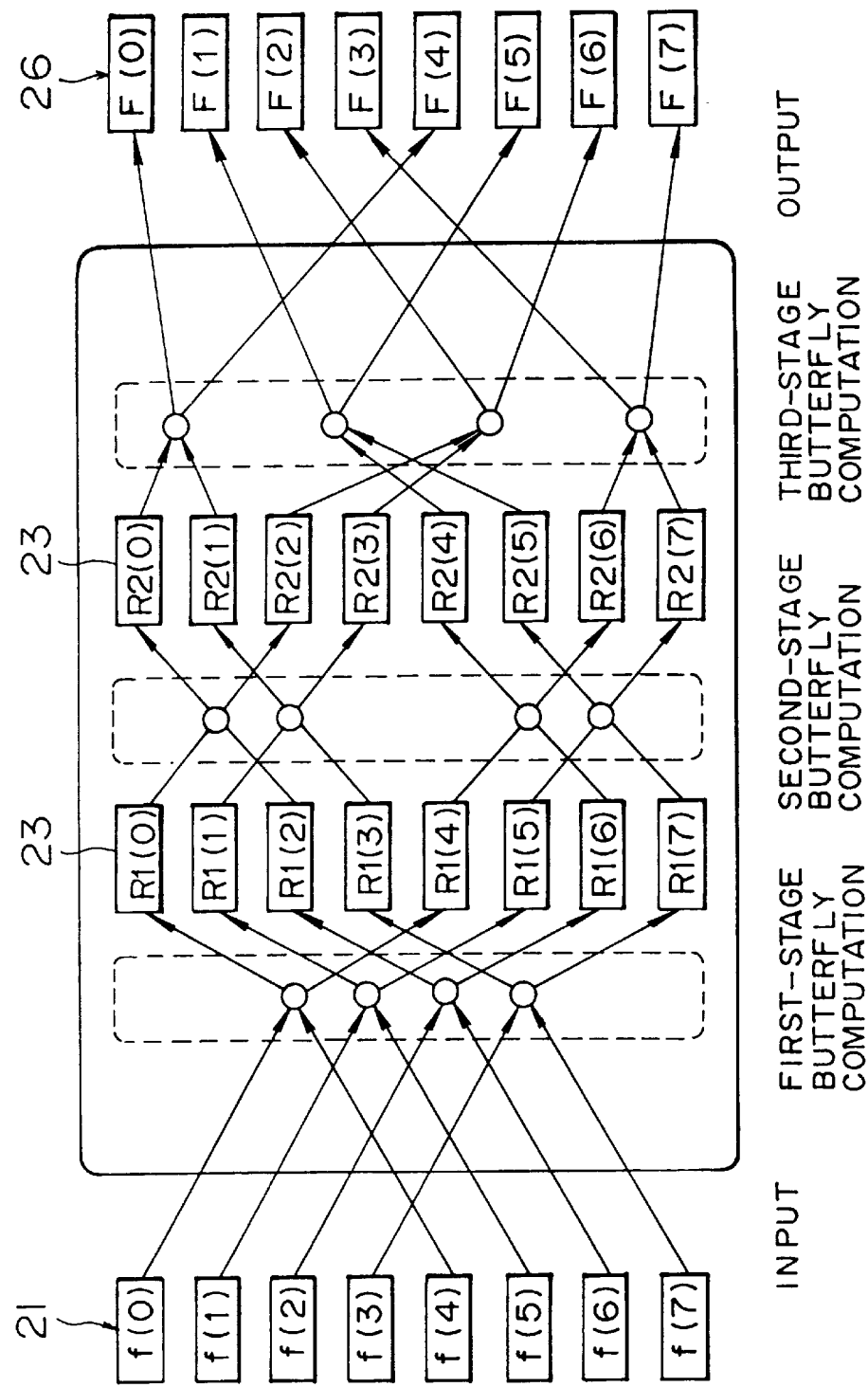
FIG. 16 shows a further signal flow in the apparatus of FIG. 8 when a frequency-thinning-type algorithm is used.

The above-described operation is an operation of a case in accordance with a time-thinning-type algorithm. Next, an operation of a case in accordance with a frequency-thinning-type algorithm will be described with reference to FIGS. 16 and 17.

The input of data from the input buffer 21 to the butterfly computation unit 24, the first-stage butterfly computation, and the second-stage butterfly computation are the same as those in the embodiment of FIGS. 12 and 13, and, therefore, a description of these steps is omitted.

Figure 17:
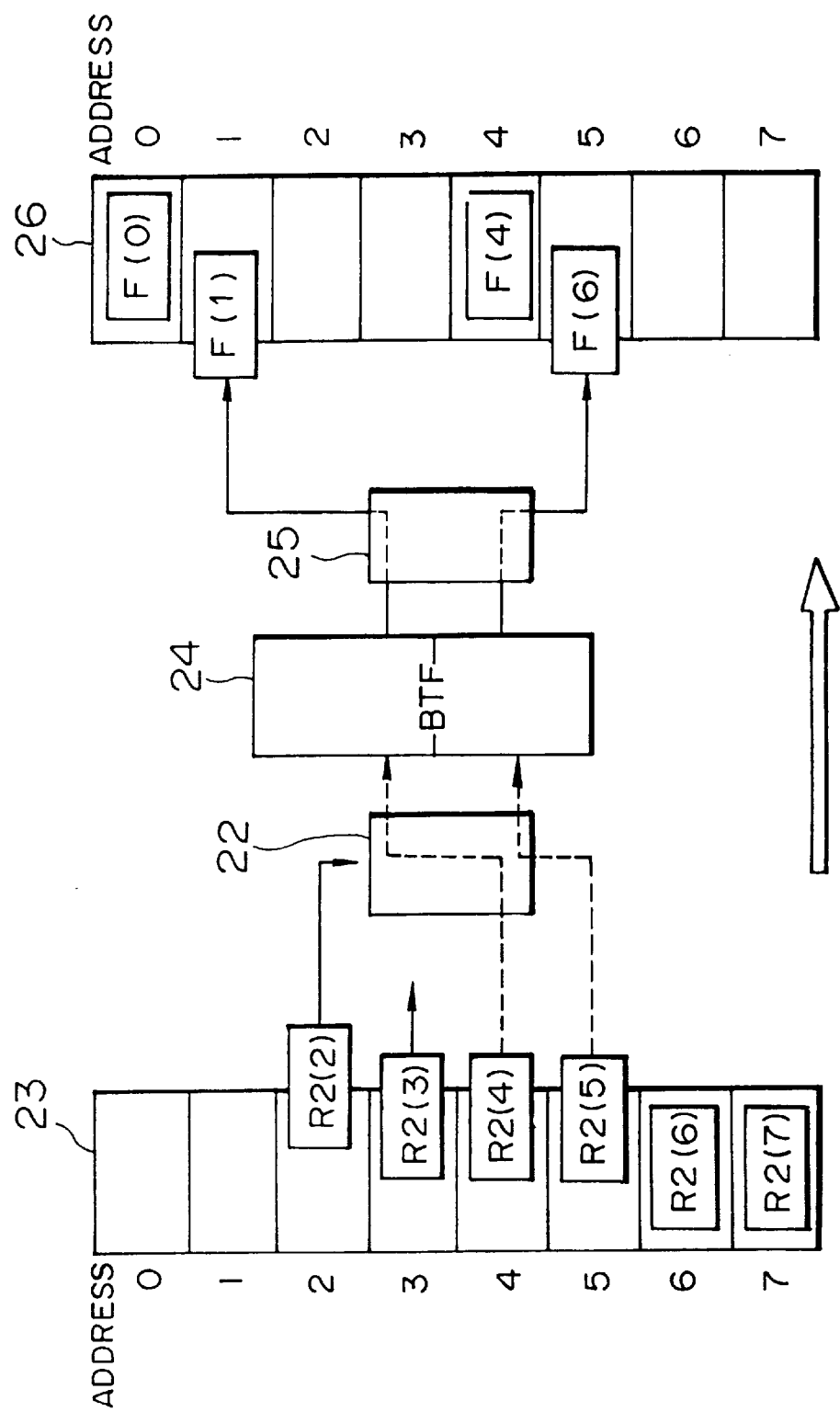
FIG. 17 shows the operation of the selectors in the signal flow of FIG. 16.

Next, in the third-stage butterfly computation, as shown in FIG. 17, a butterfly computation is first performed on the 0-th second stage computational result data R2(0) and the 1st second stage computational result data R2(1), and the computational results are stored in a reordered, reverse-digit sequence as the 0-th data F(0) and the 4-th data F(4) in the output buffer 26. Next, a butterfly computation is performed on the 4-th data R2(4) and the 5-th data R2(5), and the computational results are stored in the reordered sequence as the 1st data F(1) and the 5-th data F(5) in the output buffer 26.

Then, a butterfly computation is performed on the 2nd data R2(2) and the 3rd data R2(3), and the computational results are stored in a reverse-digit sequence as the 2nd data F(2) and the 6-th data F(6) in the output buffer 26. Finally, a butterfly computation is performed on the 6-th data R2(6) and the 7-th data R2(7), and the computational results are stored in a reverse-digit sequence as the 3rd data F(3) and the 7-th data F(7) in the output buffer 26.

In this way, when the final or third-stage butterfly computational results are stored in the output buffer 26, the data is rearranged in a reverse-digit sequence.

As a result of the above, the computational results F(0) to F(3) are stored in sequence in the output buffer 26, and at the same time the computational results F(4) to F(7) are stored in sequence in the output buffer 26. It is possible to start outputting data from the output buffer 26 as soon as the 0-th computational results F(0) have been stored. The remaining data is output in sequence. Thus, the data output from buffer 26 can proceed while the third-stage computations continue. This serves to decrease wait time making it possible to perform an FFT process quickly. Here again, instead of the butterfly computation unit 24 and selector 25 rearranging data in a reverse-digit sequence when the data is output to the output buffer 26, the input buffer 21 and selector 22 may transfer the data of in a reverse-digit sequence to the butterfly computation unit 24.

Numerous variations and combinations of the features described above can be utilized without departing from the present invention as defined by the claims. For example, in the above-described embodiments, the FFT is performed on sets of data each including eight units of data (f(0) to f(7)), it is of course possible to perform FFT on sets of data with more or fewer of units of data.

In the above-described embodiments the base number N (i.e., the number of units of data processed by one computation by the butterfly computation units 3 and 24) is set to 2 (N=2), the base number N is not limited to 2.

Also, the apparatus can include more than one butterfly computation unit, so that first-stage butterfly computations can be performed on data in one ordered set at the same time as second stage butterfly computations are performed on a preceding set. Such an apparatus may include more than one memory, or a single large memory, so that multiple sets of data such as intermediate calculation results can be stored in the memory simultaneously. Also, more or fewer selectors can be utilized. For example, in the embodiment of FIG. 3, a separate selector could be provided to transfer data from the input buffer to memory 4, in addition to the selector 2 used to transfer the data from the computation unit 3 to memory 4. Conversely, a single selector could be used to perform all of the data transfers. The buffers may comprise conventional random access memories with conventional memory controllers. Although the selectors are illustrated and described as elements separate from the other elements of the device, part or all of the selector structures can be integrated with the input buffer or output buffer structures. For example, where the input buffer includes a controller for addressing particular locations in the buffer so as to read data therefrom, the selector used to take data from the input buffer may include this controller.

The particular DAB receiver illustrated in FIG. 18 is merely one example of the larger systems which can incorporate calculation apparatus and methods in accordance with the present invention. Numerous systems use digital signals incorporate FFT processing, and the present invention can be used in any system where FFT processing is employed. Merely by way of example, the present invention can be used in video receivers; in audio receivers using many different audio broadcasting formats; and in audio and video recording and playback devices. The particular system depicted in FIG. 18 incorporates only one relatively low-speed system clock. Other systems may include plural system clocks governing different sections of the system. In this case, the input buffer may receive data in synchronism with one relatively low-speed system clock whereas the output buffer may discharge data in synchronism with a different low-speed system clock.

As these and other variations and combinations of the features discussed above can be used, the foregoing description of the preferred embodiments should be taken as merely illustrative of the present invention as defined by the claims.

What is claimed is:

1. A computation apparatus comprising:
   a memory operative to store data in an ordered set;
   an input buffer operative to store data in a first ordered set and to accept such data in synchronism with a low-speed clock;
   an output buffer operative to store data in a second ordered set and to read out such data in synchronism with a low-speed clock;
   a computation unit for accepting selected elements of data and performing butterfly computations on these data in synchronism with a high-speed clock; and
   means for transferring data in synchronism with said high-speed clock;
   (i) from said input buffer to said memory or to said computation unit; and
   (ii) between said memory and said computation unit; and
   (iii) from said memory or from said computation unit to said output buffer,
   said transferring means being operative to reorder the data during transfer from said input buffer or during transfer to the output buffer, said input buffer being operative to accept the data in predetermined time sequence so that preselected elements of said data in said first ordered set are written into the input buffer first, said transferring means being operative to begin transferring said data from said input buffer by transferring said preselected elements of said data in said first ordered set before all of the data in said first ordered set has been written into said input buffer.

2. A computation apparatus according to claim 1, wherein said transferring means is operative to write the data into said output buffer in predetermined time sequence so that preselected elements of said data are written first and said output buffer is operative to begin by reading said preselected elements of said data out from said output buffer before all of the data has been written into said output buffer.

3. A computation apparatus comprising:
   a memory operative to store data in an ordered set;
   an input buffer operative to store data in a first ordered set and to accept such data in synchronism with a low-speed clock;
   an output buffer operative to store data in a second ordered set and to read out such data in synchronism with a low-speed clock;
   a computation unit for accepting selected elements of data and performing butterfly computations on these data in synchronism with a high-speed clock; and
   means for transferring data in synchronism with said high-speed clock;
   (i) from said input buffer to said memory or to said computation unit; and
   (ii) between said memory and said computation unit; and
   (iii) from said memory or from said computation unit to said output buffer,
   said transferring means being operative to reorder the data during transfer from said input buffer or during transfer to the output buffer, said transferring means being operative to write the data into said output buffer in predetermined time sequence so that preselected elements of said data in said second ordered set are written first, said output buffer being operative to read said preselected elements of said data out from said output buffer before all of the data in said second ordered set has been written into said output buffer.

4. A computation apparatus according to claim 1 or claim 3, wherein said transferring means is operative to reorder the data during transfer from said input buffer.

5. A computation apparatus according to claim 4, wherein said transferring means is operative to transfer data from said input buffer to said memory.

6. A computation apparatus according to claim 5 wherein said transferring means includes a first selector for transferring data from said computation unit to said memory and a second selector for transferring data from said memory to said computation unit, and wherein said first selector is also operative to transfer data from said input buffer to said memory.

7. A computation apparatus according to claim 4, wherein said transferring means is operative to transfer data from said input buffer to said computation unit.

8. A computation apparatus according to claim 7 wherein said transferring means includes a first selector for transferring data from said memory to said computation unit and a second selector for transferring data from said computation unit to said memory, and wherein said first selector is also operative to transfer data from said input buffer to said memory.

9. A computation apparatus according to claim 1 or claim 3 wherein said transferring means is operative to reorder the data during transfer to said output buffer.

10. A computation apparatus according to claim 9, wherein said transferring means is operative to transfer data from said memory to said output buffer.

11. A computation apparatus according to claim 10 wherein said transferring means includes a first selector for transferring data from said computation unit to said memory and a second selector for transferring data from said memory to said computation unit, and wherein said second selector is also operative to transfer data from said memory to said output buffer.

12. A computation apparatus according to claim 9, wherein said transferring means is operative to transfer data from said computation unit to said output buffer.

13. A computation apparatus according to claim 10, wherein said transferring means includes a first selector for transferring data from said memory to said computation unit and a second selector for transferring data from said computation unit to said memory, and wherein said second selector is also operative to transfer data from said computation unit to said output buffer.

14. Apparatus as claimed in claim 1 or claim 3 wherein said transferring means is operative to reorder data in reverse-digit sequence.

15. Apparatus as claimed in claim 1 or claim 3 wherein said computation unit and said transferring means are operative to perform a set of butterfly computations in accordance with a time-thinning-type algorithm.

16. Apparatus as claimed in claim 1 or claim 3 wherein said computation unit and said transferring means are operative to perform a set of butterfly computations in accordance with a frequency-thinning-type algorithm.

17. Apparatus as claimed in claim 1 or claim 3 wherein said transferring means includes means for reading N data on which computations are to be performed from selected addresses of said memory, supplying said N data to said computation unit, and storing N results from said computation unit at said selected addresses.

18. A method of performing computations including the steps of:

writing an ordered set of data into an input buffer in synchronism with a low-speed clock, performing butterfly computations in a computation unit in synchronism with a high-speed clock, transferring data in synchronism with said high-speed clock;
(i) from said input buffer to a memory or to said computation unit; and
(ii) between said memory and said computation unit; and
(iii) from said memory or from said computation unit to an output buffer, said transferring step including the step of reordering the data during transfer from said input buffer or during transfer to the output buffer, said transferring step further including the step of transferring preselected elements of said data in said ordered set from said input buffer before all of the data in said ordered set has been written into said input buffer; and reading out data from the output buffer in synchronism with a low-speed clock.

19. A method as claimed in claim 3 or claim 18 wherein the transferring step includes the step of reordering the data during transfer from the input buffer.

20. A method as claimed in claim 19 wherein the data is reordered during transfer from the input buffer to the memory.

21. A method as claimed in claim 19 wherein the data is reordered during transfer from the input buffer to the computation unit.

22. A method as claimed in claim 3 or claim 18 wherein the transferring step includes the step of reordering the data during transfer to the output buffer.

23. A method as claimed in claim 22 wherein the data is reordered during transfer from the memory to the output buffer.

24. A method as claimed in claim 22 wherein the data is reordered during transfer from the computation unit to the output buffer.

25. A method as claimed in claim 3 or claim 18 wherein the data is reordered in reverse-digit sequence.

26. A method of performing computations including the steps of:

writing a first ordered set of data into an input buffer in synchronism with a low-speed clock, performing butterfly computations in a computation unit in synchronism with a high-speed clock;

transferring data in synchronism with said high-speed clock;
(i) from said input buffer to a memory or to said computation unit; and
(ii) between said memory and said computation unit; and
(iii) from said memory or from said computation unit to an output buffer to provide a second ordered set of data, said transferring step including the step of reordering the data during transfer from said input buffer or during transfer to the output buffer; and reading out data in from the output buffer in synchronism with a low-speed clock, the step of reading out data in said second ordered set from the output buffer commencing before all of the data in said second ordered set has been transferred to the output buffer.

* * * * *

UNITED STATES PATENT AND TRADEMARK OFFICE
CERTIFICATE OF CORRECTION

PATENT NO.    : 6,058,409
DATED         : May 2, 2000
INVENTOR(S)   : Kozaki et al.

Page 1 of 1

It is certified that error appears in the above-identified patent and that said Letters Patent is hereby corrected as shown below:

Column 16,
Line 44, "10" should read -- 12 --.

Column 17,
Line 25, "claim 3 or claim 18" should read -- claim 18 or claim 26 --.
Line 34, "claim 3 or claim 18" should read -- claim 18 or claim 26 --.

Column 18,
Line 8, "claim 3 or claim 18" should read -- claim 18 or claim 26 --.

Signed and Sealed this

Twenty-third Day of October, 2001

*Attest:*

NICHOLAS P. GODICI
*Attesting Officer*     *Acting Director of the United States Patent and Trademark Office*